(12) United States Patent
Bunker

(10) Patent No.: US 6,223,863 B1
(45) Date of Patent: May 1, 2001

(54) DISC BRAKE SUSPENSION FOR IMPROVED TURNING CIRCLE

(75) Inventor: Kenneth J. Bunker, Leicester (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/335,102

(22) Filed: Jun. 17, 1999

Related U.S. Application Data

(63) Continuation-in-part of application No. 09/303,183, filed on Apr. 30, 1999, and a continuation-in-part of application No. PCT/GB97/03388, filed on Dec. 8, 1997, and a continuation-in-part of application No. PCT/GB97/03386, filed on Dec. 8, 1997.

(30) Foreign Application Priority Data

| Dec. 12, 1996 | (GB) | ................................ 9625861 |
| Dec. 12, 1996 | (GB) | ................................ 9625863 |
| Dec. 12, 1999 | (GB) | ................................ 9625854 |

(51) Int. Cl.$^7$ .................................................. B62D 7/18
(52) U.S. Cl. .................. 188/18 A; 188/71.5; 280/93.512
(58) Field of Search ................... 188/18 A, 71.5, 188/73.38, 218 XL, 264 AA, 264 A; 280/93.512; 192/70.17–70.22

(56) References Cited

U.S. PATENT DOCUMENTS

| 2,943,827 | 7/1960 | Hartel et al. ........................... 244/111 |
| 3,146,860 | 9/1964 | Wilson .................................... 188/72 |
| 3,208,559 | 9/1965 | Chambers ............................. 188/264 |
| 3,494,448 | 2/1970 | Ruprecht ................................. 188/73 |
| 3,724,605 | 4/1973 | Naismith ............................. 188/71.8 |
| 3,788,429 | 1/1974 | Brooks ................................... 188/18 |
| 3,940,159 | 2/1976 | Pringle ............................. 280/93.512 |
| 3,941,221 | 3/1976 | Pringle ................................ 188/218 |
| 4,256,209 | 3/1981 | Lupertz ............................... 188/218 |
| 4,576,255 | 3/1986 | Mery .................................. 188/71.5 |
| 4,598,799 | 7/1986 | Thioux ................................ 188/71.5 |
| 4,674,760 | 6/1987 | Goulart . |
| 4,844,206 | 7/1989 | Casey ..................................... 188/18 |
| 4,865,160 | 9/1989 | Casey .................................. 188/18 A |
| 4,874,064 | * 10/1989 | Oono .................................. 188/70 R |
| 5,022,673 | * 6/1991 | Sekino et al. .......................... 280/673 |
| 5,048,859 | * 9/1991 | Nishikuma et al. ................ 280/18 A |
| 5,301,932 | * 4/1994 | Shibaya ................................ 267/221 |
| 5,472,068 | 12/1995 | Weiler ................................ 188/73.44 |
| 5,507,510 | * 4/1996 | Kami et al. .......................... 280/96.1 |

FOREIGN PATENT DOCUMENTS

| 2 039 003 | 2/1971 | (DE) . |
| 2148797 | 9/1971 | (DE) . |
| 2 739 128 | 3/1979 | (DE) | ............................... F16D/65/02 |
| 1 396 503 | 6/1975 | (GB) | ............................. F16D/55/00 |
| 2 015 122 | 2/1978 | (GB) | ............................. F16D/65/12 |

(List continued on next page.)

Primary Examiner—Christopher P. Schwartz
(74) Attorney, Agent, or Firm—Fitch, Even, Tabin & Flannery

(57) ABSTRACT

A reduction in size and weight of a vehicle wheel suspension is achieved by locating a brake force applicator at a top portion of a stub axle and adjacent a wheel turning axis and providing a pair of axially slidable brake discs engageable by four floating brake pads. Preferably, the force applicator is disposed within an opening or bore in a top portion of the stub axle adjacent the vertical turning axis which also passes through the stub axle. This is in contrast to the conventional sliding caliper that is mounted at either the front or the rear of a fixed brake disc and projects substantially further outward with respect to the vertical turning axis. The inclusion of the brake force applicator such as a hydraulically operated piston in the stub axle and the use of the pair of slidable brake discs provides better operational characteristics in addition to lighter weight, decreased size, and decreased turning circle relative to a conventional sliding caliper, fixed brake disc assembly

11 Claims, 16 Drawing Sheets

FOREIGN PATENT DOCUMENTS

| | | | |
|---|---|---|---|
| 2 049 845 | 12/1980 | (GB) | F16D/55/00 |
| 2 076 087 | 11/1981 | (GB) | F16D/55/36 |
| 2 184 801 | 7/1987 | (GB) | F16D/65/12 |
| 61166759 | 7/1986 | (JP) . | |
| PCT/GB98/02680 | 9/1998 | (WO) . | |
| 70/5340 | 9/1970 | (ZA) . | |

* cited by examiner

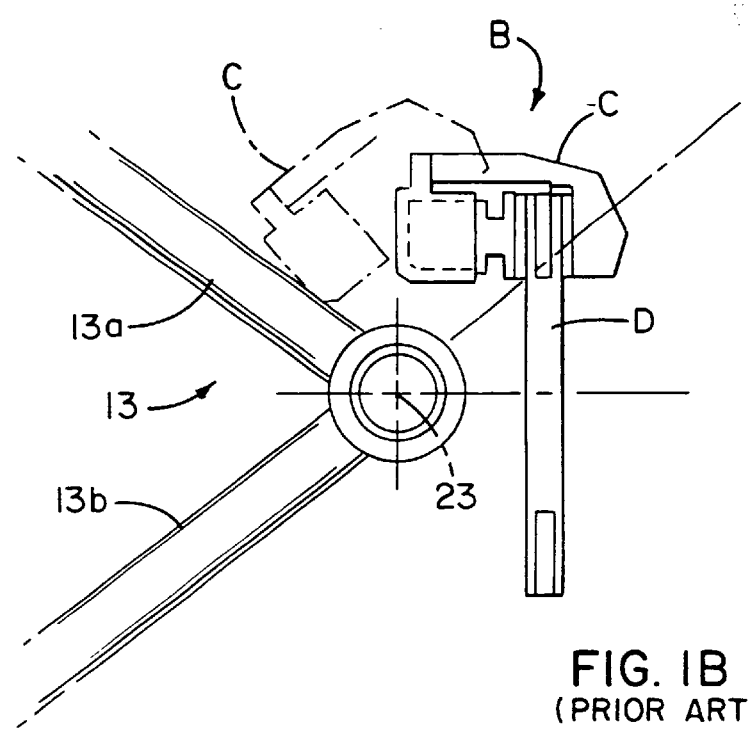
FIG. IB
(PRIOR ART)
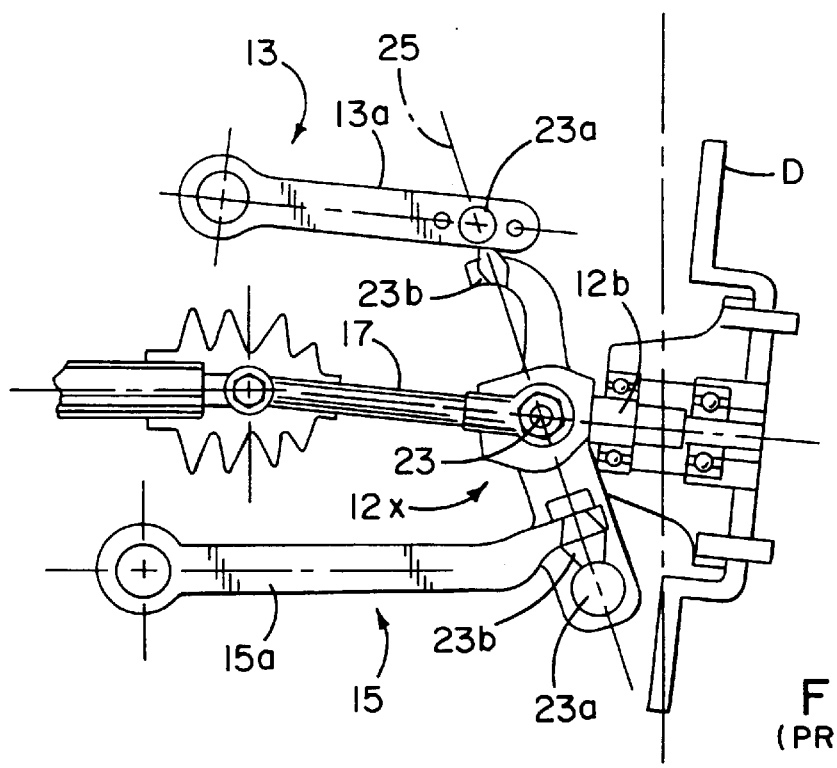
FIG. IC
(PRIOR ART)

DISC BRAKE SUSPENSION FOR IMPROVED TURNING CIRCLE

This application is a Continuation-In-Part of U.S. patent application Ser. No. 09/303,183, entitled "Slidable Brake Disc System", filed Apr. 30, 1999, and this application is a Continuation-In-Part of PCT application, Application No. PCT/GB97/03388, filed Dec. 8, 1997, designating the United States and a Continuation-In-Part of PCT application, Application No. PCT/GB97/03386 filed Dec. 8, 1997, designating the United States. PCT applications PCT/GB97/03388 and PCT/GB97/03386 are hereby incorporated herein by reference in their entirety.

FIELD OF THE INVENTION

This invention relates to a front wheel suspension for a vehicle and to providing an improved turning circle for the vehicle.

BACKGROUND OF THE INVENTION

The conventional front wheel suspension has a turning circle which is defined as the smallest turning radius that the front wheels may turn with the steering wheel angling the vehicle wheels to the maximum extent. The radius is between a rotational center located on line extended through the rear wheel axis to a wheel pivot axis at a stub axle about which the wheel pivots. The maximum angle through which the front wheels can turn is usually called the locking angle. There is a front locking angle for the near front wheel and a rear locking angle for the farther front wheel. One limitation on the extent of front wheel pivoting is the abutment of a caliper of a front wheel disc brake with another portion of the suspension such as a top or bottom support member for the stub axle. The top and bottom supports are often wishbone suspension members or a McPherson strut suspension member. The top and bottom support members support the stub axle and are connected by ball connections to the stub axle for turning it about an axis through these ball joint connections. A steering suspension member is connected at one end to a rack and pinion steering device, or the like; and it is pivotally connected at its other end to the stub axle. The stub axle also carries a hub for mounting the wheel for rotation.

The conventional caliper disc brake is usually mounted at a rear location in the sense of its being behind the wheel axle as the vehicle is traveling in a forward direction. This rearward location of the caliper rearwardly results in protection of the braking mechanisms and steering arm from being damaged during a crash because the mass of the motor protects them if the front end of the vehicle is being crushed into the motor during an accident. Although it is possible to locate the caliper forwardly on the brake disc, rather than rearwardly, then the caliper is not so protected by the vehicle engine during a crash. Moreover, the wheel is turning downwardly at a caliper front location, and the weight of the vehicle is also directed downwardly onto the stub axle; and these downward forces are additive during a braking operation when the caliper is located forwardly. Because the wheel rotation is up at a rear caliper location, an upward force from the wheel opposes the downward force due to the weight of the vehicle on the stub axle. Because of the additive effects due to a front caliper positioning, the stub axle and wheel bearings often are made larger to provide increased stiffness and load carrying capabilities that may not be needed when the caliper is rearwardly mounted.

The relatively heavy weight of a conventional stub axle and its large sliding caliper are undesirable because the stub axle and wheel are an unsprung mass. Even for small automobiles, the combined weight of the stub axle and conventional caliper brake mechanism is about 18 kg. Automobile manufacturers are trying to decrease this unsprung weight of this portion of the front wheel suspension to improve driving characteristics and lower fuel consumption.

The conventional caliper disc brake is not mounted at the top portion of the stub axle for several reasons, one of which is that of "knock back" of the hydraulic piston in the hydraulic cylinder of the floating, slidable caliper. More specifically, during cornering which develops high side loads, the brake disc fixed to the wheel hub pushes on the brake pad and pad carrier and thereby pushes the piston back into the cylinder by several thousandths of an inch or more resulting in a subsequent longer piston stroke than usual for braking the vehicle to a stop. This "fall back" of the piston deeper within the cylinder requires a longer travel of the piston when the brakes are next applied, and results in a long pedal feel to the vehicle driver. Fall back is avoided by putting the caliper at a front or rear location.

The conventional caliper disc brake includes a slide bolted to the stub axle with the brake cylinder and piston within this slide. At the onset of brake application, the hydraulic fluid in the cylinder shifts the piston, and it moves a brake carrier and brake pad thereon to abut one side of the fixed brake disc; and through a reaction force, the caliper slide shifts to bring a fixed brake pad on a distal end of the slide into engagement with the opposite face of the fixed brake disc. In order to contain the hydraulic cylinder and piston therein and to provide the requisite stiffness for the support of the fixed brake pad during a braking operation, the caliper slide or housing is usually quite large and heavy. Again, this weight is an unsprung weight, and hence, undesirable. Further, the large size of the caliper increases its outward projection and hence, its ability to foul with a suspension member. The exact fouling location is difficult to describe precisely because when traveling over rough roads, the suspension member shifts vertically and can abut the fully turned caliper brake at locations it may not abut when traveling over a smooth road.

The conventional caliper extends a considerable distance radially outwardly a considerable distance from the wheel vertical turning axis. Hence, it is desirable to have a brake assembly that does not project radially outwardly so far from the vertical turning axis to reduce fouling of the brake mechanism with a suspension member.

Although the caliper slide or housing are usually quite large, its distal end of a bridge carrying the fixed brake pad is still subjected to deflection to an undesirable extent at the forces exerted by a line pressure, which is usually 70 BARS or more for a high coefficient of friction road surface. This deflection causes hysteresis loss when the brake apply and release cycles are very frequent, as during an ABS controlled iteration of wheel deceleration and wheel acceleration cycles. Further, the deflection may cause a problem with the return of the piston to the exact location in the cylinder in the cylinder. The return of the piston is by a return force from a seal compressed during outward travel of the piston; and this force and travel are limited, and unwanted deflection of the distal slide end may cause problems with the proper positioning of the piston in the cylinder. Many efforts have been made to increase the stiffness of the caliper slide to limit this deflection of the distal end of the slide caliper without increasing too much the size or the weight of the caliper slide.

In addition to being heavy and large, the conventional caliper, disc brake system has a relatively large, residual brake torque, which is the braking torque experienced due to a rubbing between the brake pads and fixed brake disc while the brake system is in an off-brake condition. Residual torque wastes fuel, decreases the life of the brake pads and disc, and increases the initial temperature of the brake pads and discs at the start of fade tests, such as the AMS fade test. Moreover, the residual brake torque retards the vehicle wheel during a wheel speed up portion of an ABS iterative wheel acceleration/deceleration cycle. This results in a slowing down the iterative cycle during an ABS braking operation.

The present invention is directed to a slidable, brake disc assembly mounted on a stub axle and suspension to reduce the turning circle by providing a more compact brake disc and stub axle assembly that does not foul in the manner of a conventional, slidable caliper brake having a fixed brake disc. There exists a fair number of slidable disc brake patents which disclose the broad concept of slidable brake discs and some use a large caliper, which is attached to the stub axle and the caliper projects radially outwardly from the stub axle by a considerable extent to provide a large radius from the wheel turning axis to the outer end of the caliper. It is desired to provide a more compact and low profile, slidable brake disc and stub axle assembly than disclosed in these patents. Many of these patents disclose slidable brake disc assemblies without disclosing a stub axle or knuckle; hence, they are unconcerned with providing a brake and knuckle assembly that has a low profile and is compact to improve the turning circle of the vehicle. Moreover, these patents disclose slidable, disc brake systems that are not currently used in original equipment vehicles because they have shortcomings in their operation, which have been overcome in this invention.

From the foregoing, it will be seen that there is a need for an improved wheel suspension having a slidable disc brake and stub axle assembly that does not limit the turning circle to the extent limited by the conventional caliper brakes and which is lighter in weight and has better operational characteristics.

SUMMARY OF THE INVENTION

In accordance with the present invention, the vehicle wheel suspension is provided with a decreased turning circle, as well as a reduction in size and weight, by a compact, low profile stub axle and brake caliper combination. This is achieved by mounting the force applicator at the top of the stub axle with a smaller radius projection from the steering axis than the conventional caliper mounted at the front or rear of the fixed brake. The turning circle, in one example, may be decreased about 21% because the locking angle is increased substantially before any interference occurs between the slidable disc brake assembly and one of the suspension members.

The compact brake and stub axle assembly preferably employ a force applicator located at a top portion of the stub axle and adjacent the wheel turning axis. Herein, the force applicator is disposed within an opening or bore in a top portion of the stub axle adjacent the vertical turning axis, which also passes vertically through the stub axle. Thus, the force applicator, such as a cylinder and piston, are actually within the confines of the stub axle casting placing them about as close as they can be to the vertical axis. This is in contrast to conventional calipers that are mounted exteriorly of the stub axle extrusion and at a substantially greater distance from the turning axis.

From a weight and size standpoint, the preferred vehicle suspension employs a stub axle and brake assembly, which weighs less and is smaller. Also, better operational characteristics are achieved relative to a conventional caliper, fixed brake assembly.

BRIEF DESCRIPTION OF THE DRAWINGS

FIG. 1B is a diagrammatic view of a conventional caliper, fixed disc brake and its locking angle;

FIG. 1C is a side elevational view of a prior art suspension having a caliper and a fixed disc brake;

DETAILED DESCRIPTION OF THE PREFERRED EMBODIMENTS

Figure 1:
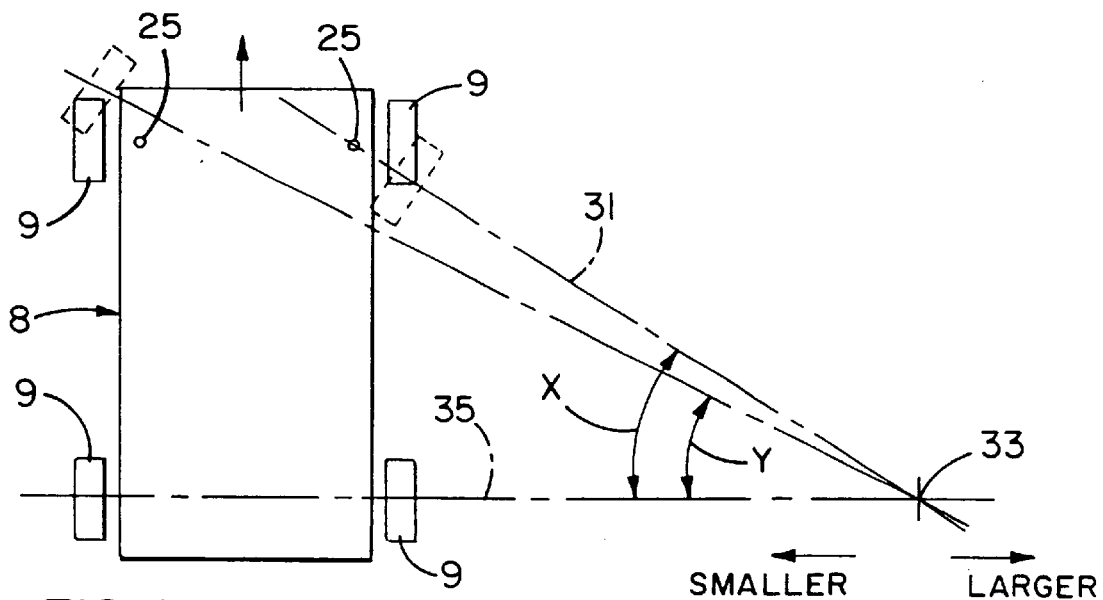
FIG. 1 is a diagrammatic illustration of vehicle's locking angle and its turning circle.
Figure 1A:
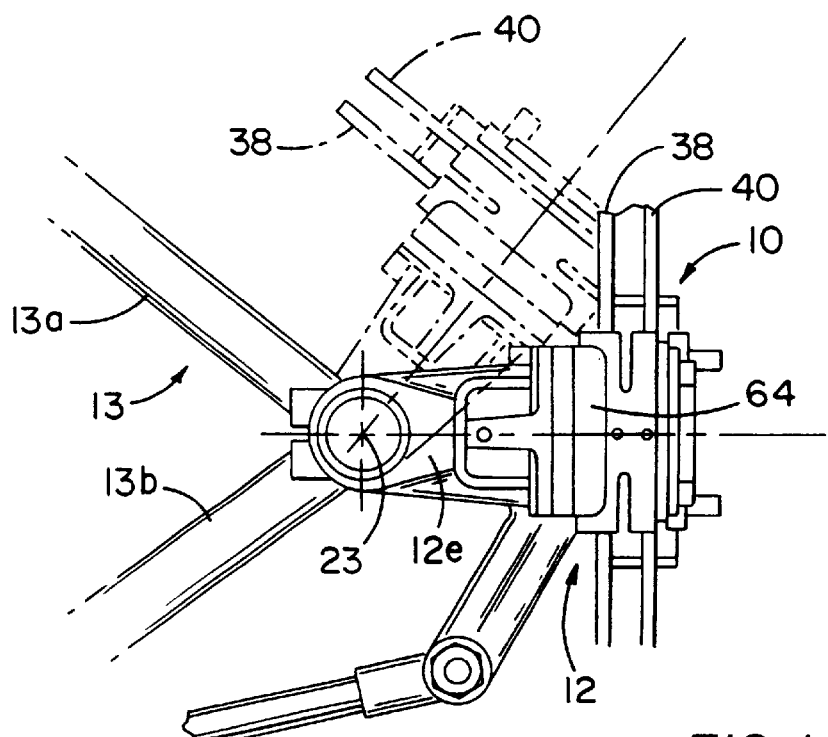
FIG. 1A is a diagrammatic view of the increased locking angle provided by the suspension stub axle and slidable disc braking assembly.

As shown in the drawings for purposes of illustration, the invention is embodied in a suspension 11 that comprises a stub axle or vertical suspension member 12 usually in the form of a metal casting. The term "stub axle" is used herein to define the vertical casting to which a braking assembly 10 and wheel are mounted and which is mounted on a vehicle suspension for turning about a vertical turning axis 25 when steering the vehicle. The term "knuckle", or link, is often used rather than stub axle to describe this part. Other terms, such as suspension link or member, etc., may be used. Whatever the term used, the member that has the structure and performs the functions set forth for the stub axle in the claims hereof, falls within the purview of this invention. The conventional stub axle used in the wishbone suspension shown in FIGS. 1C–1E has been designated "12x" and mounts a conventional caliper or disc brake assembly C at a front 3:00 o'clock location. The stub axle used in the McPherson strut (illustrated in FIGS. 1H and 1I) has been designated "12y", and it mounts a conventional caliper C at a front 3:00 o'clock position. The present invention employs a stub axle 12 and a slidable brake disc assembly 10, which can be substituted into the wishbone suspension of FIGS. 1C–1E for the stub axle 12x and brake caliper C. Likewise, the stub axle 12 and slidable brake assembly 10 of this invention can be substituted for the stub axle and brake caliper C in the McPherson strut suspension of FIGS. 1H and 1I.

The suspension members (FIGS. 1C–1E), including an upper suspension member 13 and a lower suspension member 15. Typically, the upper suspension member 13 comprises wishbone struts (FIGS. 1C–1E) or a McPherson struts (FIGS. 1H and 1I), and the lower suspension member 15 comprises a wishbone or other kind of suspension member. Additionally, the suspension 11 includes a steering member, such as a steering arm 17, which is connected to the stub axle 12 to turn and steer a wheel 9 (FIG. 1) mounted on a hub 14, which is rotatably mounted by bearings 21 in the stub axles.

The wishbone suspension illustrated will first be described, and then the McPherson strut suspension will be described. The illustrated wishbone suspension comprises the upper wishbone suspension member 13 having a pair of upper wishbone arms 13a and 13b (FIGS. 1C–1E), which have a common V intersection at which is carried a ball joint connection 23 with an upper ball 23a and a depending pin 23b. The pin 23b is mounted in a bore 24 (FIGS. 1F, 1G, 5 and 7) in an upper, mounting portion 12b of the stub axle. This upper, mounting portion 12b projects inwardly of the wheel from a central portion 12c of the stub axle. The portion 12b is of conventional form to clamp about the ball joint pin, which is disposed between two semi-cylindrical arms having a gap therebetween to form a clamp, which can be tightened by a bolt spanning the gap and extending through the aligned bores 28 in the semi-cylindrical arms.

Figure 11:
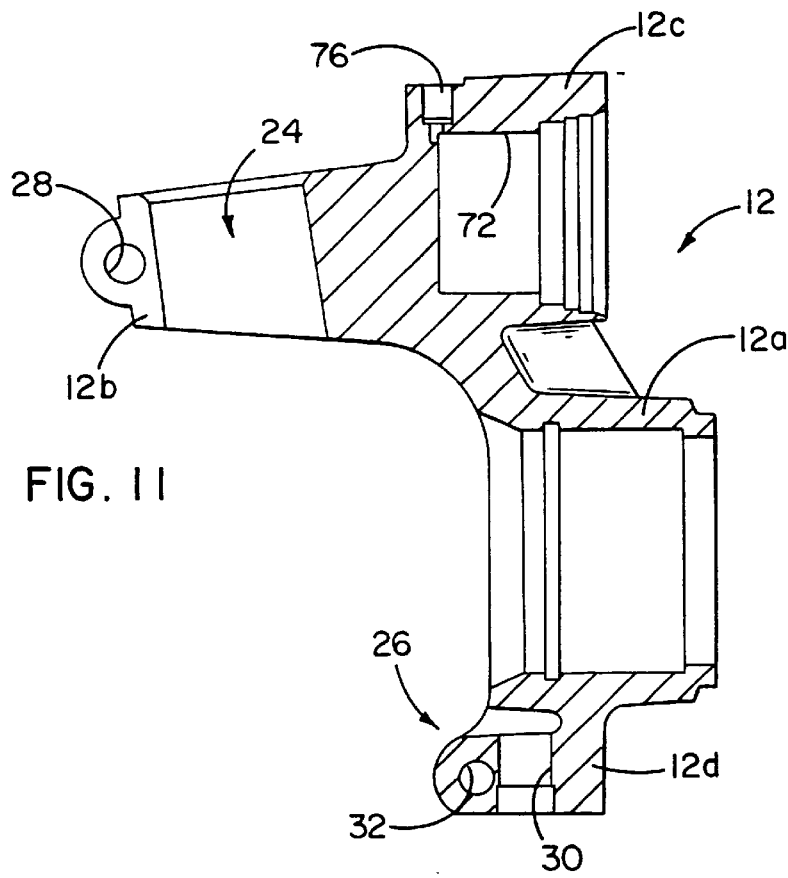
FIG. 11 is a vertical cross-sectional view taken through a suspension link of the illustrative assembly.
Figure 12:
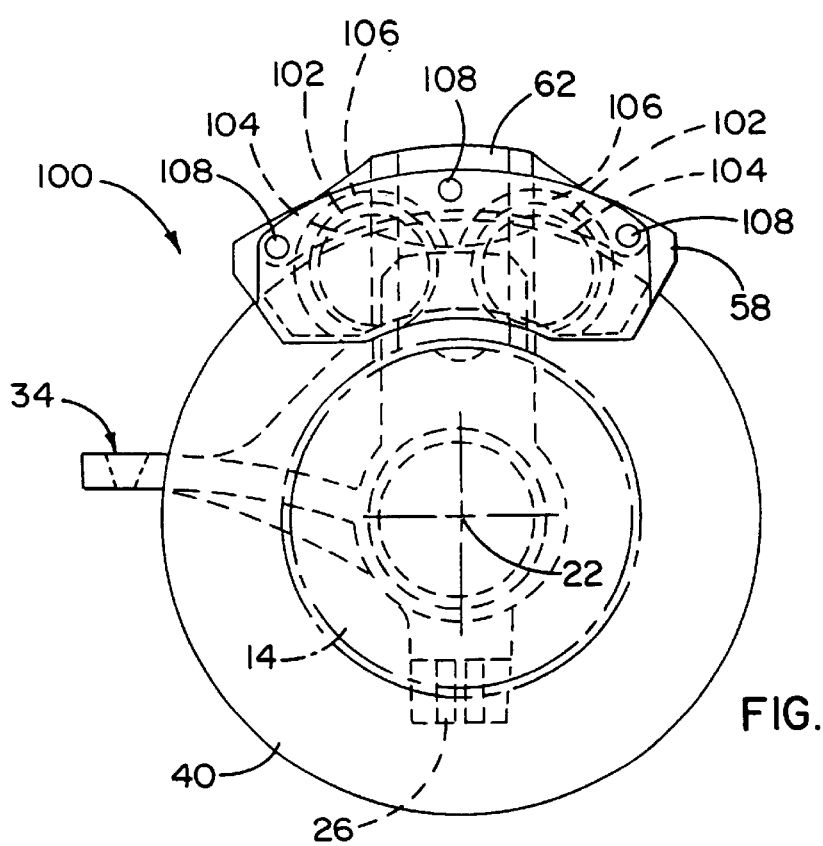
FIG. 12 is a view similar to FIG. 16, but of a modification of the illustrative assembly.

The lower wishbone suspension member 15 also has a pair of wishbone arms 15a and 15b (FIGS. 1C–1E) which have a common V intersection at which is carried a ball joint connection 23 having a lower ball 23a (FIG. 1C) and upwardly-projecting pin 23b to be clamped in a lower mounting 12d (FIGS. 11 and 12) of the stub axle 12. The pin 23b is inserted into a bore 30 in the lower mounting, which is located below the central hub 14. The pin is clamped between two, semi-cylindrical clamp arms having a gap therebetween, and a bolt (not shown) is inserted through aligned openings 32 in the clamp arms. When the bolt is tightened to clamp the lower ball connection, the stub axle is then mounted to and supported by the lower wishbone suspension member 15 are attached to the stub axle 12x. Herein, the upper and lower suspension members are connected to the upper and lower mounting portions 12b and 12d of the stub axle.

Figure 1D:
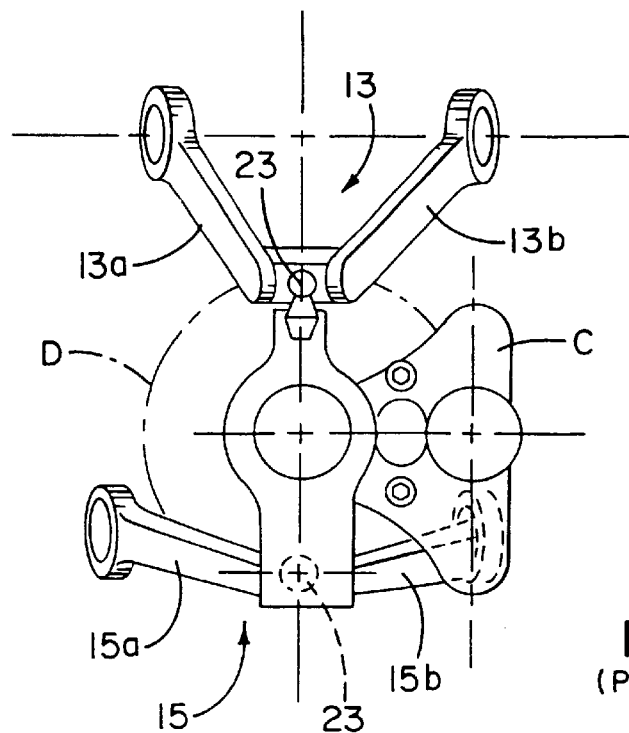
FIG. 1D is a side view of suspension, caliper and disc brake shown in FIG. 1C.
Figure 1E:
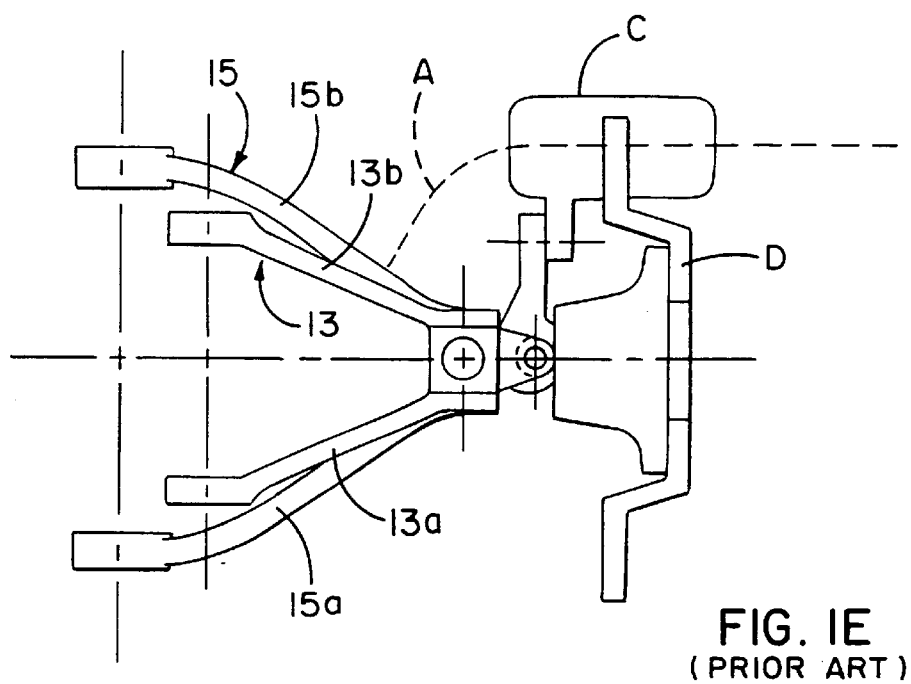
FIG. 1E is a plan view of suspension, caliper and brake disc shown in FIG. 1C.
Figure 1F:
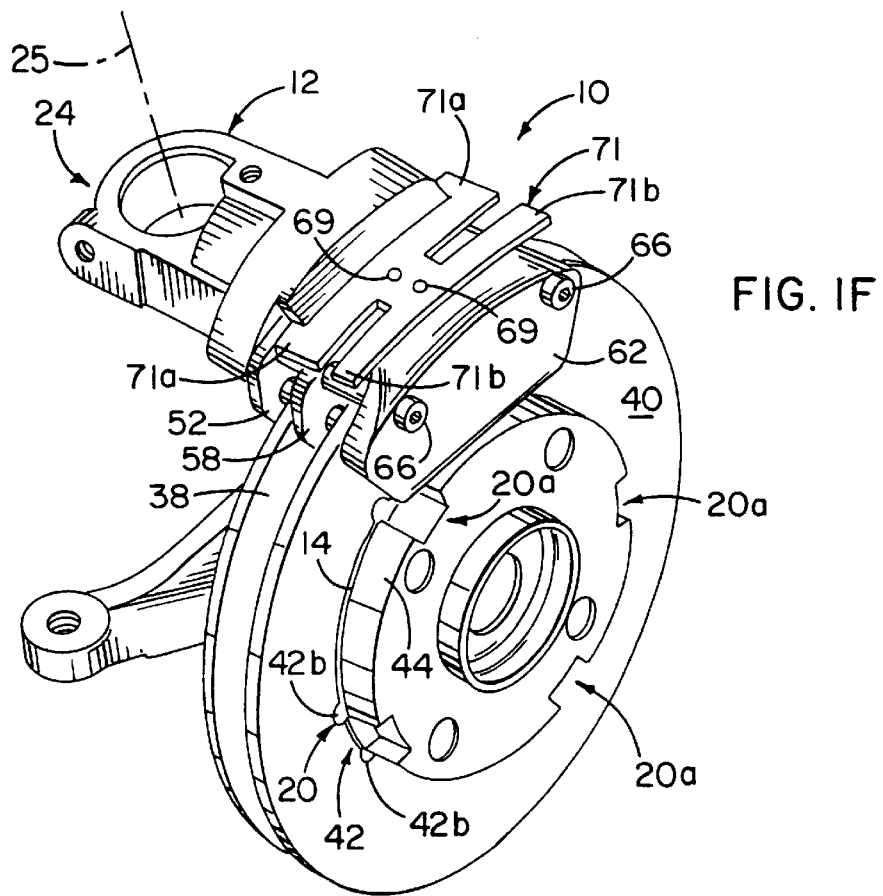
FIG. 1F illustrates a stub axle and slidable disc brake assembly of the preferred embodiment of this invention to which are substituted into the suspension of FIGS. 1C–1E to be used rather than conventional caliper and its stub axle in the suspension.
Figure 1G:
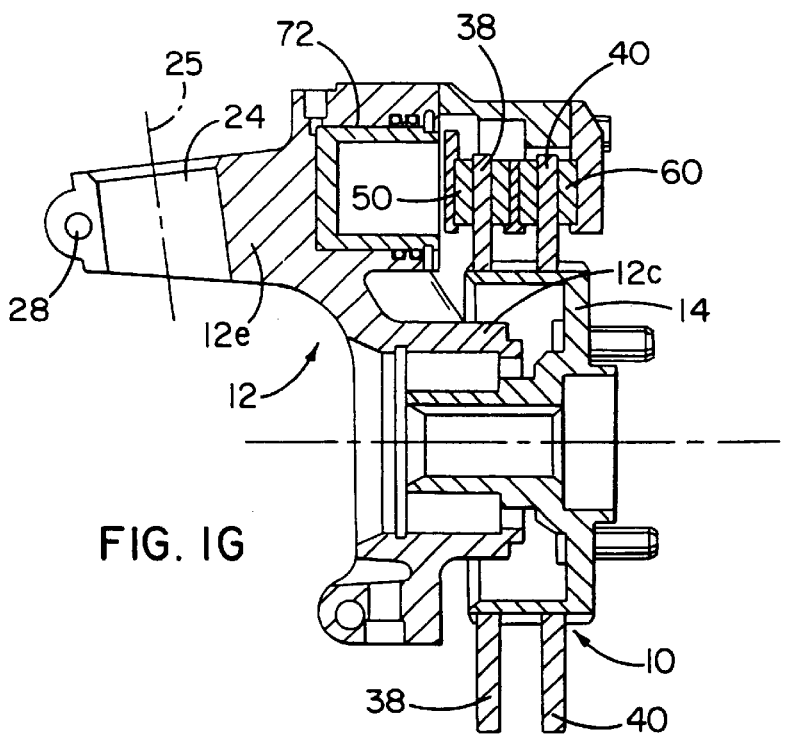
FIG. 1G is a cross-section through the stub axle showing the brake pad force actuator closely positioned adjacent the wheel turning axis and at the top portion of the stub axle.
Figure 1H:
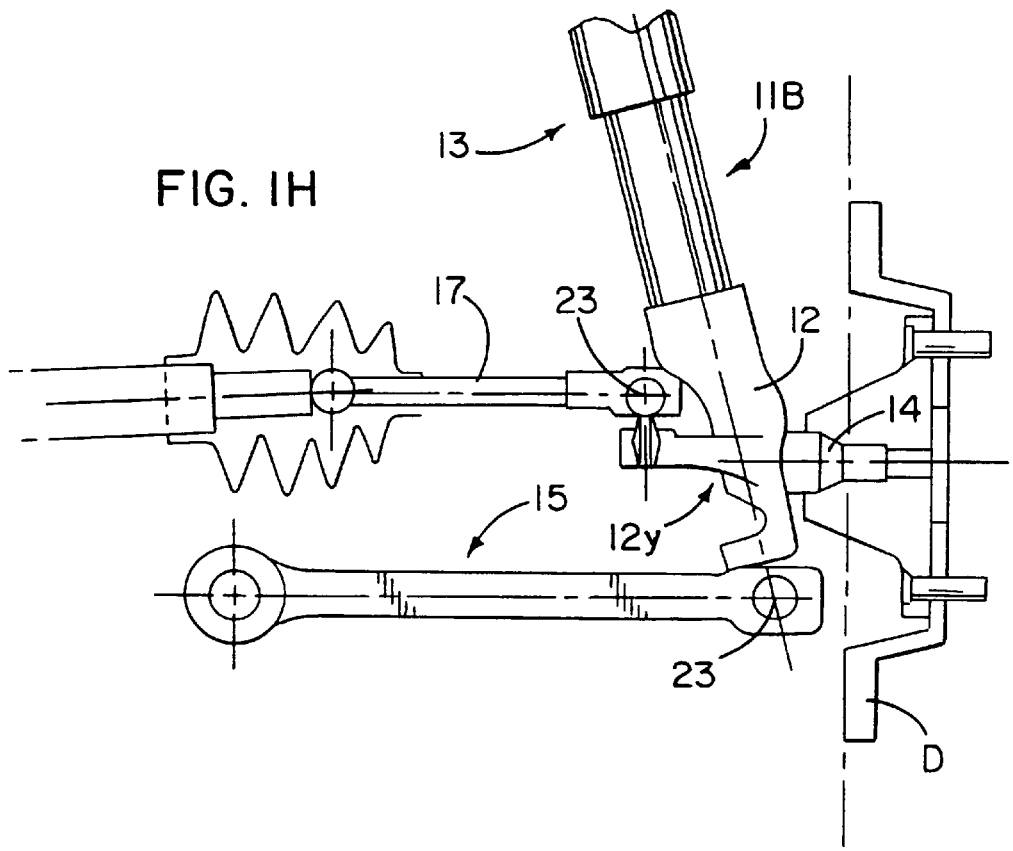
FIG. 1H is a side elevational view of a McPherson strut suspension.

To turn the stub axle 12x or 12y and the wheel 8, the steering arm 17 is also connected to the stub axle 12x by a ball joint connection 23 (FIGS. 1E and 1H). The steering arm or track rod extends inwardly to a rack and pinion or other device, which pushes or pulls the steering arm to cause a pivoting of the wheel 8 and stub axle about a substantially vertical, turning axis 25 (FIG. 1C) through the center of the bores 24 and 26 in the upper and lower ball joint connections 23 at these bores. Typically, this vertical axis is inclined inwardly about 7° relative to the true vertical for the vehicle. The stub axle is connected to the steering arm 17 by a portion 12e of the stub axle, which has an arm 34 that projects sideways and inwardly from the wheel and stub axle. A vertical bore 36 is formed in the outer end of the arm 34 to receive a pin portion of a ball joint connection 23 to the steering arm 17.

The McPherson strut suspension 11B (shown in FIGS. 1H and 1I) comprises an upper suspension member 13, a lower suspension 15, as well as a steering arm or link 17. A caliper brake assembly C is shown mounted at a front 3:00 o'clock location and for turning, as shown by a dotted line toward a position to foul with the upper suspension member 13 (FIG. 1I) at the locking angle.

Vehicle manufacturers generally desire to have a smaller, rather than a larger, turning radius for the vehicles. As can be best understood from a review of FIG. 1, the vehicle 8 has wheels 9 with a pair of front wheels, which are shown in dotted lines to be turned to the maximum extent, which is defined as a locking angle. The front, right wheel in FIG. 1 is pivoted by the steering arm 17 to turn the stub axle about the vertical axis 25. A radius line 31 extends from a center point 33 at the center of the turning circle and is located on a line 35 extended through the axis of the rear wheels. The radius defines with the line 35 an angle x, which is the front locking angle. A similar radius from point 33 to the left vertical axis 25 through the left stub axle defines a back lock angle y. If one can turn the wheels more sharply to decrease the turning circle, the center of point of the turning circle is shifted to the left in FIG. 1, and the lock angles are increased. By way of example, for a large rear drive automobile having a wheel base of 112 inches and a track of 65 inches, to achieve a theoretical turning circle of 38 feet, the front lock angle is 29° 30', and the rear lock angle is 40°. In front drive vehicles, the lock angle is often limited to a lesser amount, e.g., 47°, because the lock angle is limited in turning by a constant velocity joint joined to the wheel hub to rotate the wheel. If the constant velocity joint is not a constraint, then the brake caliper abutting a portion of the suspension members will be a limitation on the lock angle. The present invention is applicable to both front and rear drive vehicles, as will become apparent hereinafter.

Figure 1I:
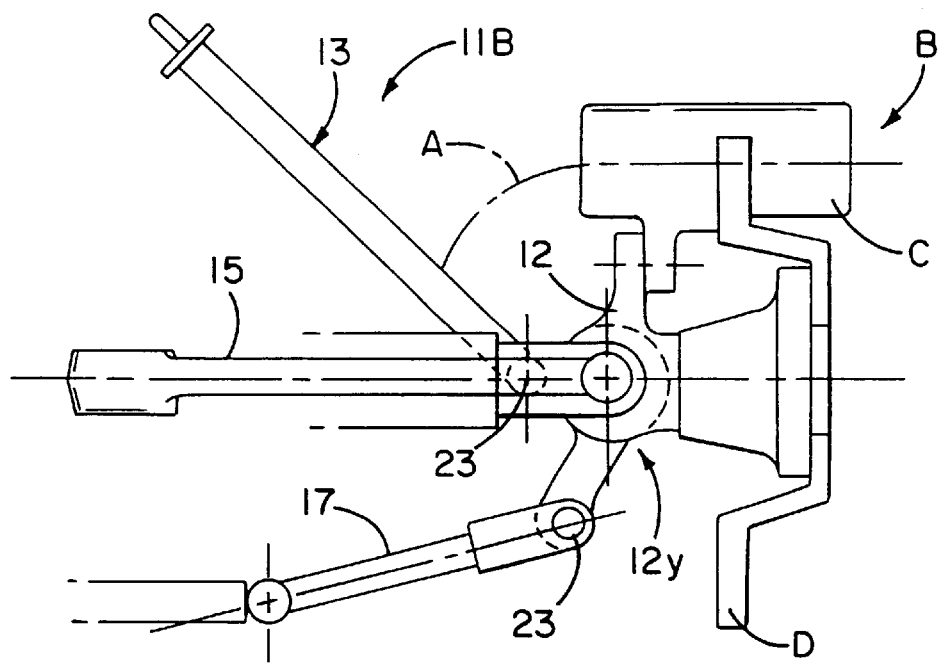
FIG. 1I is a plan view of the McPherson strut suspension of FIG. 1H, showing a conventional, prior art caliper moving to a fouling position to limit a turning circle for this suspension.

As best seen in FIGS. 1B, 1E and 1I, with the conventional caliper brake B mounted at the front of the fixed brake disc D, a turning of the caliper brake brings a portion, such as caliper C, thereof into abutment with a suspension member, such as the lower wishbone arm 15a (FIG. 1E or upper suspension member 13 (FIG. 1I). As shown by an arc A in FIG. 1E, the front mounting of the brake caliper C extends to and has a large radius R from the vertical turning axis 25. That is, the caliper is connected to the stub axle but a long distance radius from the stub axle and the vertical, wheel turning axis 25. As seen in FIGS. 1E and 1I, the caliper C is mounted outwardly at about a three o'clock position on the rim of the brake disc. In the rear mounted caliper brakes, the caliper is at about a nine o'clock position. The top of the brake disc D is at the twelve o'clock position. There is a need for a more compact brake and stub axle assembly than is provided by the conventional caliper and suspension system.

In accordance with the present invention, a vehicle suspension is provided with a more compact slidable disc brake and stub axle assembly, and this results in an increased locking angle X and a smaller turning circle, as well as a lighter weight and improved operating characteristics for the suspension. This is achieved by mounting the slidable, disc brake assembly 10 at the top of the stub axle and mounting the brake force actuator at the top portion of the stub axle and close to the vertical turning axis 25. That is, the mounting of the slidable disc brake assembly's force actuator, such as the piston 74 and cylinder 72 at the top center of the stub axle, places them close to the vertical turning axis 25 and reduces substantially the radius R between them and the vertical turning axis 25. Herein, the cylinder 72 and piston 74 are within a bore in the stub axle rather than projecting radially outwardly from the stub axle to a 3 or 9 o'clock on the brake disc D, as in the slidable, caliper brake system. Thus, the wheel 9 may be turned through a greater lock angle with a reduction in the turning circle for the vehicle.

An objective of this invention is to redesign and position the brake caliper and stub axle assembly such that a foul with a suspension member is eliminated or occurs after a greater locking angle has been achieved. For the large, rear drive automobile described above having a wheel base of 112 inches and a track of 65 inches, and having a conventional caliper mounted at a rear, 9:00 o'clock position, the turning circle may be decreased by a desired eight feet from 38 feet to 30 feet. In this example, the respective from front and rear locking angles increase from 29° 30' to 38° 30', and from 40°–56° with this eight foot reduction in turning circle. Manifestly, it is not possible to describe and to predict whether a previous brake assembly fouling with a suspension member will be eliminated or how much an increase in lock angle will be achieved with this invention because of the wide variations in sizes, track widths and suspensions used in various commercial, large volume automobiles.

As will be explained in greater detail, the slidable brake discs 38 and 40 will not cause fall-back of the piston 74 in the cylinder 72 in the manner of the fixed brake disc of the conventional caliper brake. During certain cornering operations, loads directed sideways have been known to deflect the fixed brake disc and cause it to push the piston back into the cylinder, resulting in fall-back, which is one of the reasons that the caliper for the fixed disc brake is not mounted at the top of the stub axle. The preferred brake discs 38 and 40 of this invention are mounted in a floating manner to slide readily along the hub 14 such that when experiencing similar sideways loads, the floating discs will not exert pressure to cause an undesirable amount of fall-back of the piston 74 in the cylinder.

In the illustrated and preferred embodiment of the invention, the cylinder 72 is formed integrally in a top portion 12b of the stub axle 12 adjacent the vertical turning axis 25 in contrast to the conventional caliper cylinder, which is at the large radius R (FIG. 1E). The conventional caliper brake has a large heavy slide containing the cylinder and piston in contrast to a small, fixed bridge 64 (FIG. 1F), which carries the slidable brake pads 50, 54 and 56 and outer, fixed brake pad 60. For a small, conventional automobile, the weight of the brake unit and stub axle has been reduced by about 3Kg from 18Kg to 15Kg. The preferred brake discs 38 and 40 are thin flat discs, preferably of metal, such as steel or a composite mater, and are light in weight in comparison to the cast metal, heavy brake disc with an outer, shoulder portion between its rim portion and its center hub portion. The lighter weight, slidable disc brake assembly 10 of this invention is also less expensive than the conventional caliper assembly with its slidable housing and cylinder and its cast iron brake disc D fixed to a hub on the stub axle.

From an operational standpoint, the slidable, twin disc, brake assembly 10 has a lower residual torque drag, an increased brake pad life and operates at lower hydraulic pressures than does a comparable fixed disc brake assembly used on the same small vehicle. This twin disc brake assembly 10 is also compatible with the current ABS operating system used on the small vehicle. The conventional disc brake assembly and its stub axle were removed from a commercial automobile, and the slidable, twin disc brake assembly 10 and the illustrated stub axle 10 were installed in its place and operated with the existing ABS system. Tests show that by the use of the four braking pads and twin brake discs that hydraulic line pressure may be decreased by about one-half, such as from about 70 BAR for a high coefficient of friction road surface to about 40 BAR or less for the slidable twin disc brake. With lower operating pressures and less residual torque drag, the brake pad life has been extended, e.g., from about 60,000 kilometers to about 120,000 kilometers. Lower pressures also mean less hysteresis in the system for the seals and expandable hoses. Lower pressures also result in less deflection of the outer distal end of the bridge or slide carrying the fixed brake pad.

Figures 6, 7:
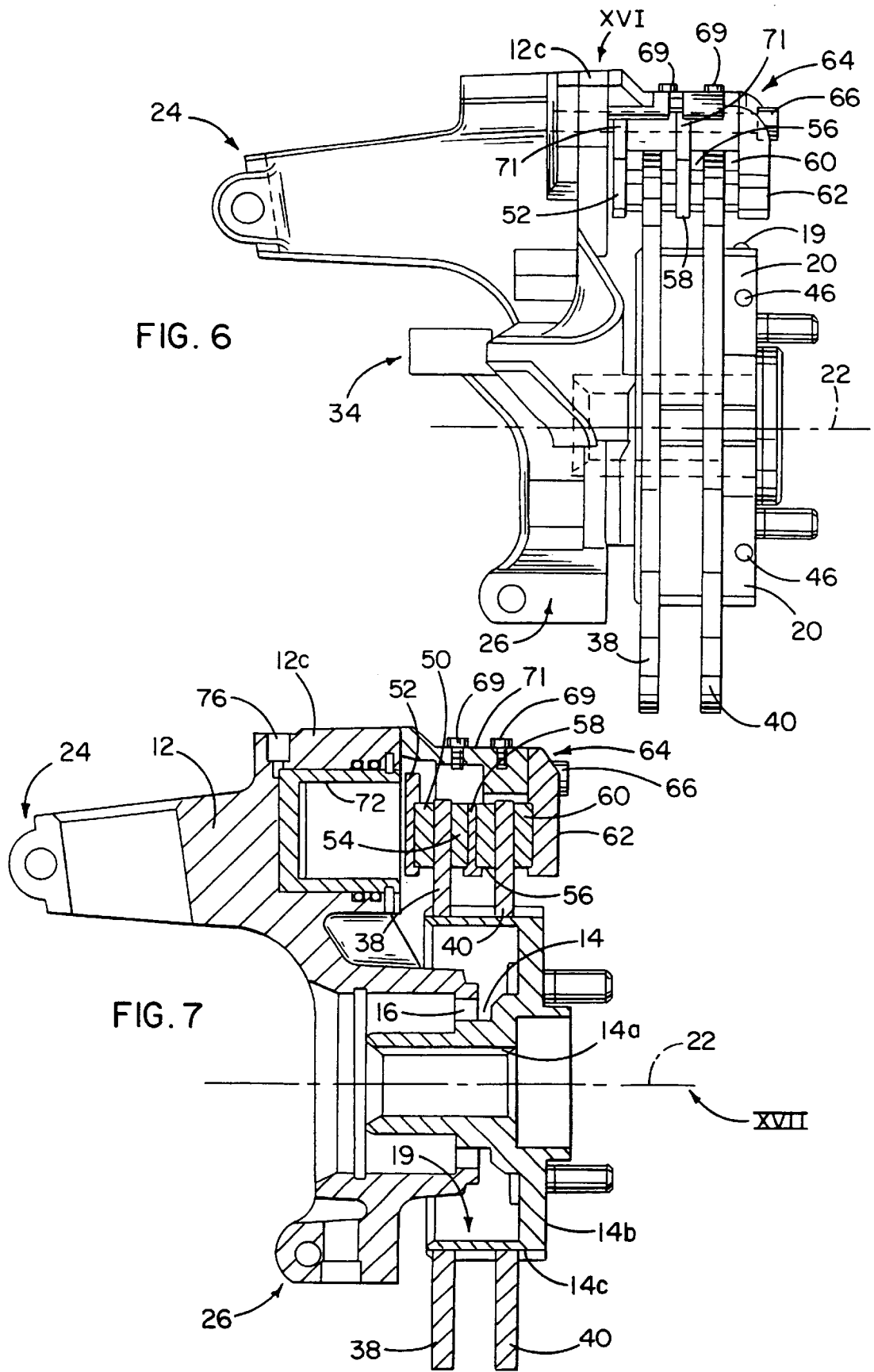
FIG. 6 is a side elevational view of the illustrative assembly.
FIG. 7 is similar to FIG. 6 but shows the illustrative assembly in vertical cross section.

The hub 14 mounted on the stub axle is an integral casting and, as is conventional, has a hollow cylindrical rearward projection 14a which has a splined interior, and an exterior, which provides a mounting for roller bearings 16 (FIG. 7). A splined projection at the end of a drive shaft is received within the projection so that the hub can be rotated on the bearings 16 by the drive shaft. The hub also has an annular disc-like portion 14b from which the portion projects rearwardly. The hub provides a mounting for the wheel 8 which is bolted against a forward surface of the portion by bolts received in holes 14d. The hub also has a hollow cylindrical rearward projection 14c of greater diameter than the portion. The portion projects from the outer edge of the portion 14b. The portion 14c has an outer surface provided with grooves 20 running parallel to the axis 22 about which the hub rotates. The grooves 20 are arranged in four equally circumferentially-spaced locations.

The preferred and illustrated suspension stub axle 12 of this invention (FIG. 11) is an integral casting and comprises a hollow cylindrical portion 12a of conventional form, which provides a mounting for the bearings 16 so that the hub 14 rotates on the stub axle. The stub axle also comprises the top and bottom mountings 24, 26 for supports of the stub axle. The bottom mounting 26 is provided by a portion 12d of the stub axle 12, which projects downwardly from the portion 12a thereof. This portion 12d is of conventional form and has the vertical bore 30, to receive the pin of the ball joint connection 23.

Figure 5:
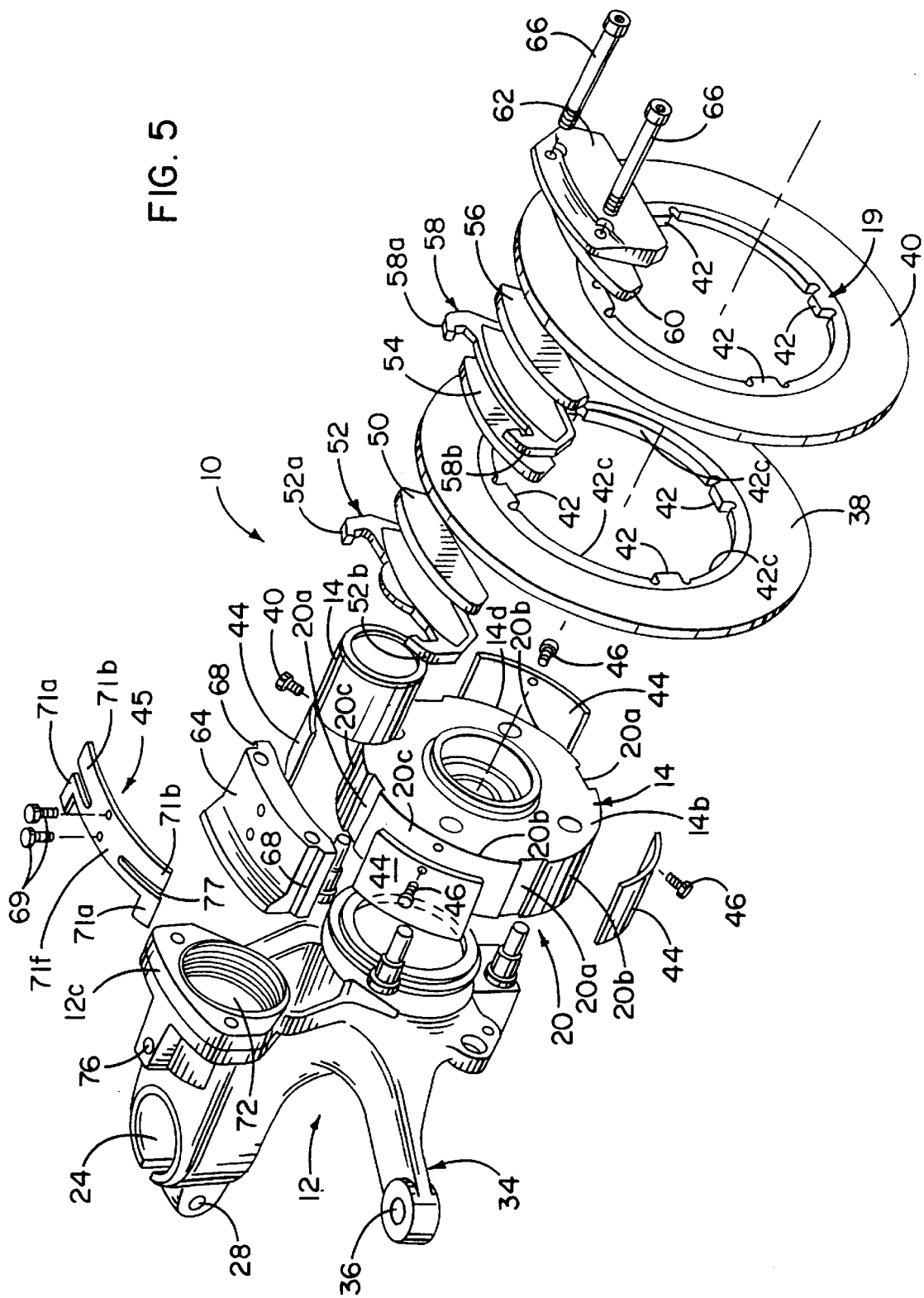
FIG. 5 is an exploded view of the illustrative assembly.
Figure 15:
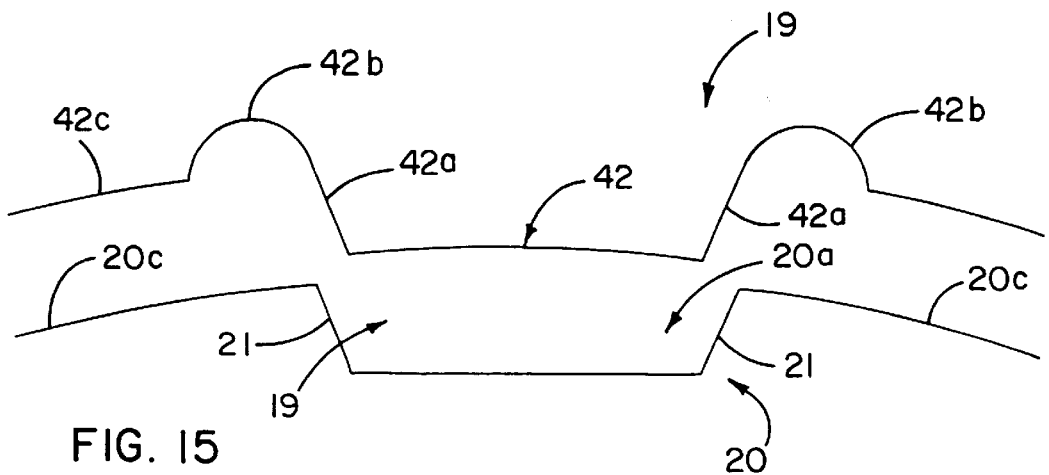
FIG. 15 is an enlarged, fragmentary and exploded view of the driving connection between a hub and slidable brake disc.
Figure 15A:
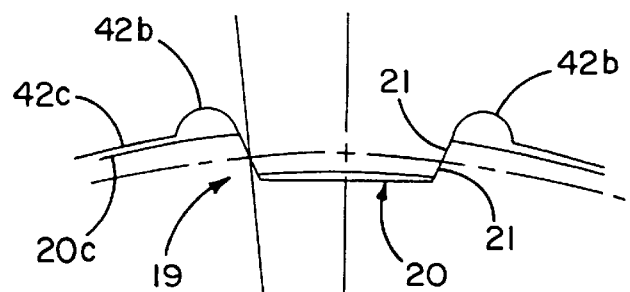
FIG. 15A is similar to FIG. 15 except that the driving connection is enlarged and meshed to drive the brake disc with rotation of the hub.
Figure 16:
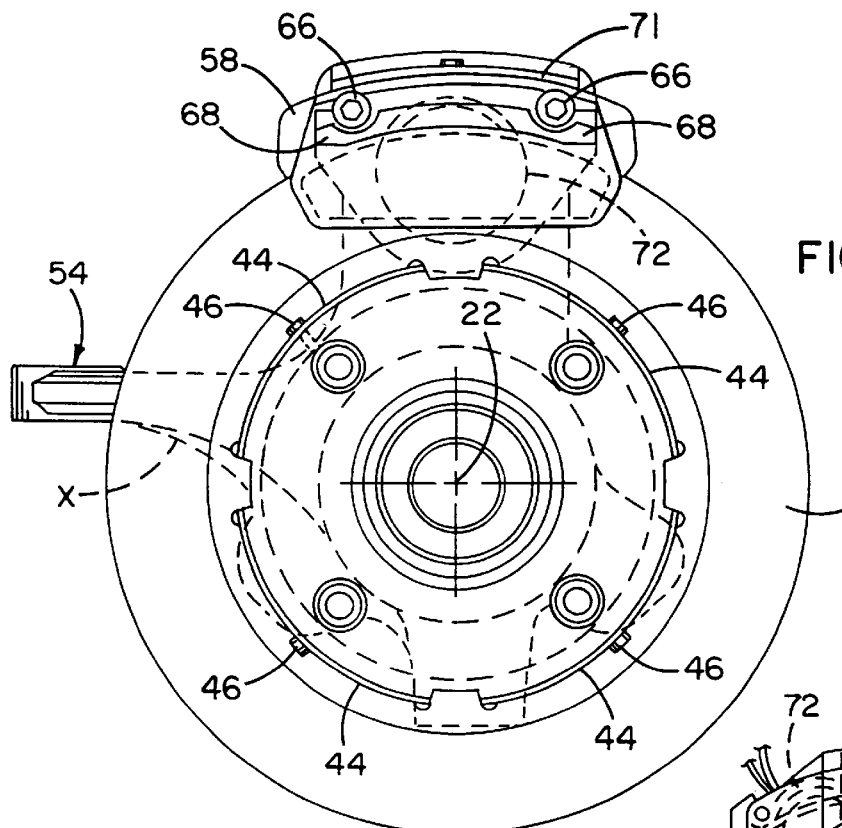
FIG. 16 is a view taken in the direction of the arrow XVI in FIG. 6.

The twin discs 38 and 40 are identical to one another and are mounted for limited movement on the hub 14 in a direction generally parallel to the axis 22 about which the hub rotates. Specifically, each disc is in the form of a flat annular plate and has inwardly-projecting teeth 42. As best seen in FIGS. 5, 15 and 15A, it is preferred that the brake discs 38 and 40 each have a limited number of wide teeth, i.e., the illustrated four teeth 42 that mesh with the spline grooves 20a of splines 20 on the hub. The spline grooves 20a are four in number, in this instance, and have flanking walls 21 (FIG. 15) that match flanking walls 42a on brake disc teeth 42. The engaged flanks 21 and 42a have an angle A for their respective tooth flange angles. Manifestly, the number of teeth and splines may be varied. Because of large stresses generated on the thin teeth 42 on these relatively thin brake discs, there is a tendency of stress cracks to form, particularly after high temperature heating and cooling cycles and high stress cycles. To relieve such stress, there are provided large, curved, stress relief fillets or cut-outs 42b in the respective brake discs. Herein, as shown in FIGS. 15 and 15A, the stress relieving fillets are provided on each side of a tooth 42 and provide generally semi-cylindrical, cross-sectional openings on each side of each tooth, when the teeth are fitted into a spline grooves, as shown in FIG. 15A.

As best seen in FIG. 5, the four grooves 20 on the hub are relatively small compared to the projecting teeth 20b defined between each pair of adjacent grooves 20. These teeth 20b on the hub have large, arcuate surfaces 20c against which are laid the leaf springs 44. Thus, each leaf spring 44 has a large circumferential area contact with inner, arcuate surfaces 42c of the brake disc in the place between depending teeth 42 thereon.

Four leaf springs 44 are mounted on the hub 14 to provide resilient force applying means to apply radial forces between the hub and the discs 38 and 40. These radial forces prevent the discs from tilting on the hub, prevent rattling and control sliding of the discs along the hub. The resilience of the springs allows thermal expansion to be accommodated, as explained above. The springs are secured in a suitable manner, such as by screws 46 to the outer surface 20c of the hub portion 14c in the gaps between the spline grooves 20a. Each of the four springs engages both of the discs 38 and 40 in the areas between the teeth 42, giving a resilient four-point mounting for each disc. The discs can slide on the hub parallel to the axis 22 with the teeth sliding in the spline grooves 20a.

Figure 4:
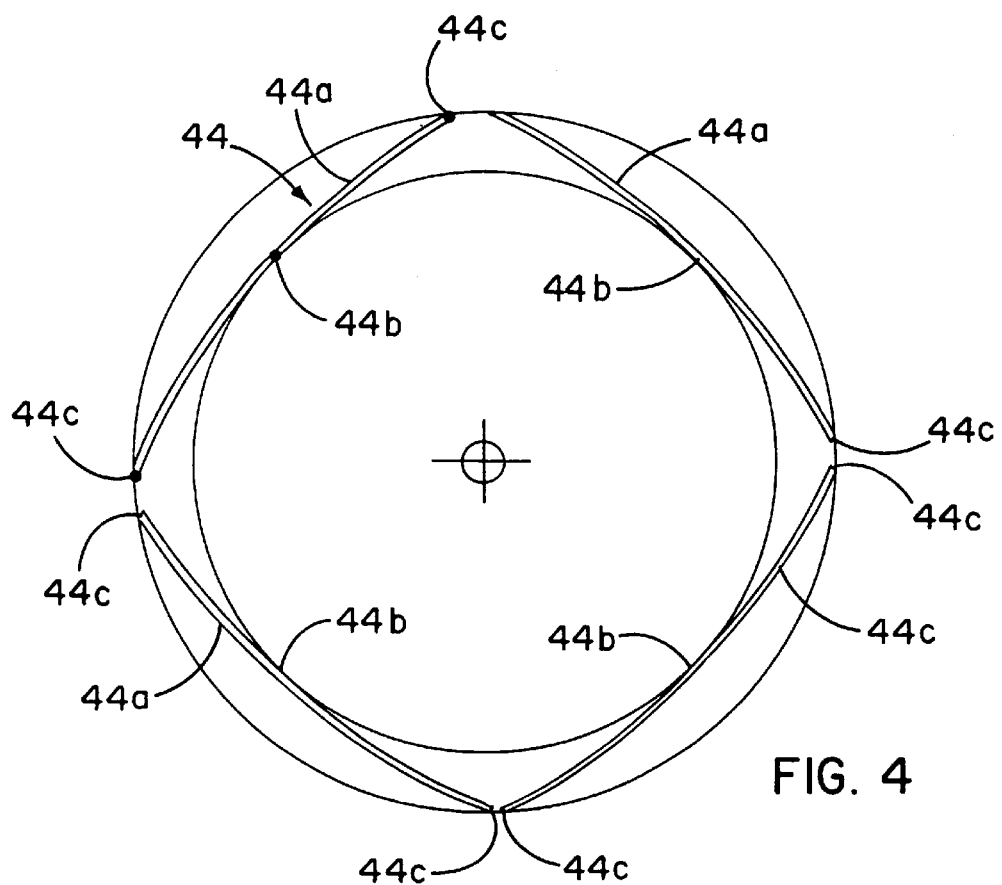
FIG. 4 is a diagrammatic view of four leaf springs constraining a brake disc on a hub.
Figure 13:
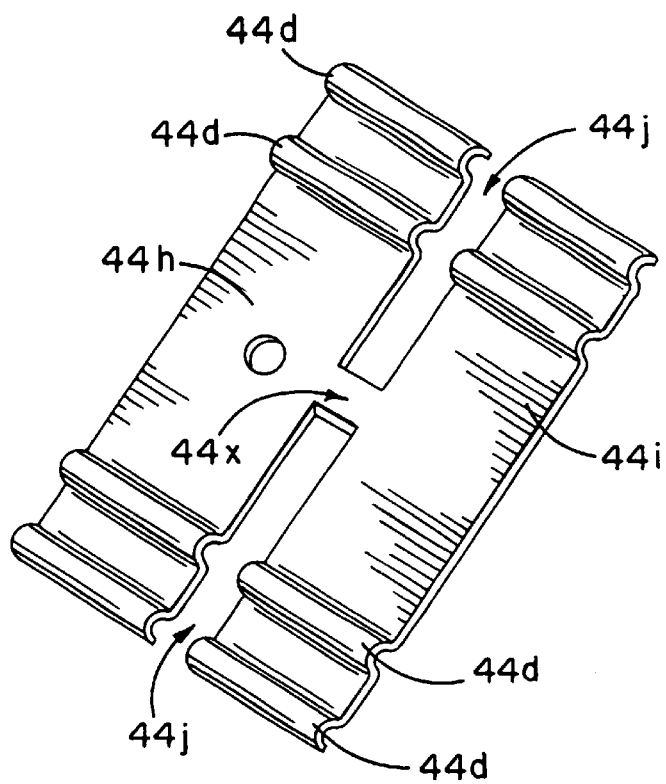
FIG. 13 is a perspective view of an alternative leaf spring having raised ribs thereon.
Figure 14:
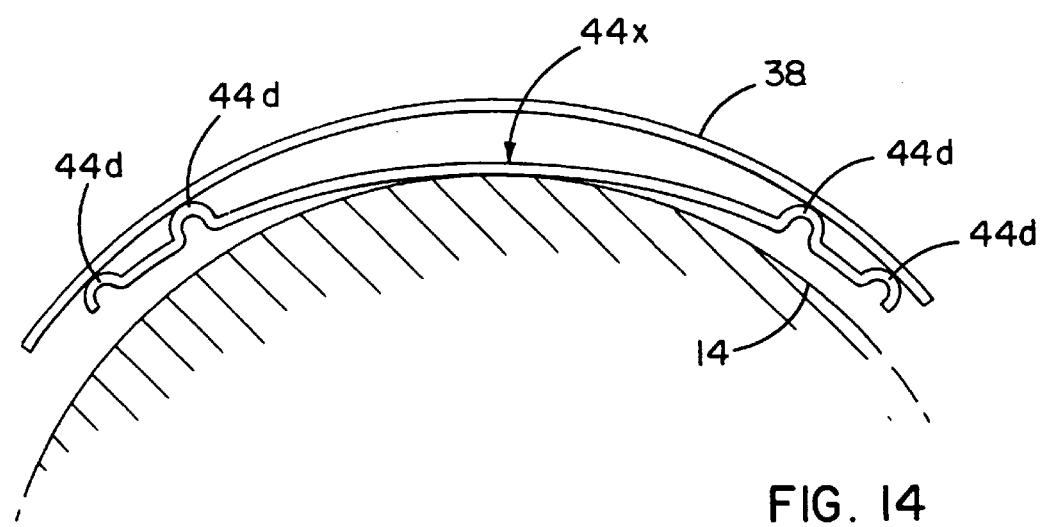
FIG. 14 is a diagrammatic, enlarged view of the points of contact between the leaf springs and the brake disc.

As best seen in FIG. 4, the flat leaf spring 44 is engaged with and has a pressure line of contact with the hub at point 44b; and the outer ends of the spring 44c have been flexed downwardly to provide pressure line of contact engagement with the discs 38 and 40 at these bent spring ends. In order to provide more lines of engagement between the disc and the hub, the spring 44x may be provided with ribs 44d therein, as shown in FIGS. 13 and 14. Also, it is preferred to separate the spring 44 into separate biasing portions 44h and 44i (FIG. 13) separated by a slot 44j each portion acting on an associated disc 38 or 40 to provide more individualized, independent pressure forces between the associated disc and the hub. The springs 44 are balanced in the force they apply to the brake discs 38 and 40 relative to the force which the springs 71a and 71b apply to the slidable brake pad carriers 52 and 58. Both the brake discs and the brake carriers are constrained against shifting along the hub and the bridge respectively, due to vibrations and inertial forces from the vehicle when it is traveling. Thus, it will be seen that the springs 44 allow the slidable brake discs to: float on the hub, hold the discs in a radial plane normal to the rotational axis, apply frictional forces that prevent squealing; apply frictional forces that aid in holding the discs in position while rotating in their off-brake positions; and permit axial forces from the force actuator to outwardly slide the discs to their braking position with engagement of the disc 40 with the stationary brake pad 60.

Turning now in greater detail to the illustrated brake pads, these pads comprise the first pad 50 which is mounted on a backing plate 52 and is arranged to engage a side surface of the disc 38, pads 54 and 56, which are mounted on opposite sides of a backing plate 58 and are arranged, respectively, to engage the opposite side surface of the disc 38 and a facing side surface of the disc 40, and the pad 60 which is mounted on a backing plate 62 and is arranged to engage the opposite side surface of the disc 40. The backing plate is fixedly mounted on a guide member or bridge 64, which is, in turn, fixedly mounted on the portion 12c of the stub axle 12. Specifically, two bolts 66 pass through bores through the portion 12c and the guide member 64, and have threaded ends which are received in threaded bores in the backing plate. The stationary guide member 64 provides two guidance surfaces 68 on which the backing plates 52 and 58 slide. The guidance surfaces 68 extend, parallel to the axis 22, along opposite sides of the member 64. The guidance surfaces may take other forms such as the shafts of the bolts 66.

Each guidance surface 68 receives a pair of concave, U-shaped projection or hooks of the pad carriers 52 and 58. As best seen in FIG. 3A, the slidable pad carrier 58 has hook-shaped projections 59 with inner sliding surfaces 59a, which are slidably supported on the upwardly-facing support surfaces 68 of the bridge 64. To assist in achieving the desired balance to allow the brake pad carriers 52 and 58 to be pushed apart from and by the brake discs 38 and 40, when they are shifting axially from their brakes-on to their brakes-off positions; and yet constrain the pad carriers and their brake pads from tilting, it is preferred to machine flat the inner sliding surfaces 59a on the carriers and the supporting surfaces 68 on the bridge. Flat machined surfaces on the carriers engaging flat machine surfaces on the bridge assures a more uniform, frictional, constraining force to retain the brake pad carriers against axial sliding from their off-brake positions. Also, the carriers will have broader, wider engagement with bridge supporting surfaces 68 to assist in preventing significant rocking or tilting on the bridge under vehicle inertial forces and/or vibrations when the vehicle is moving, as would cause localized rubbing contact in the off-brake condition.

If the slidable brake pad position is not controlled, the slidable brake pad may tilt to engage or to vibrate against the slidable brake disc and generate a random wear pattern on the disc causing DTV and vibration of the disc. The control of the slidable pad and disc is important in a very dynamic situation with the vehicle wheel carrying the slidable brake system over bumpy or smooth roads, cornering with brakes on, cornering with brakes off, with ABS system on, with an ABS system off, etc. On cornering, the hub deflects and moves the disc surface to engage the brake pad; and after cornering, the pad and disc separate as the brake recovers to its steady state of low residual torque at the off-brake position.

Figure 2:
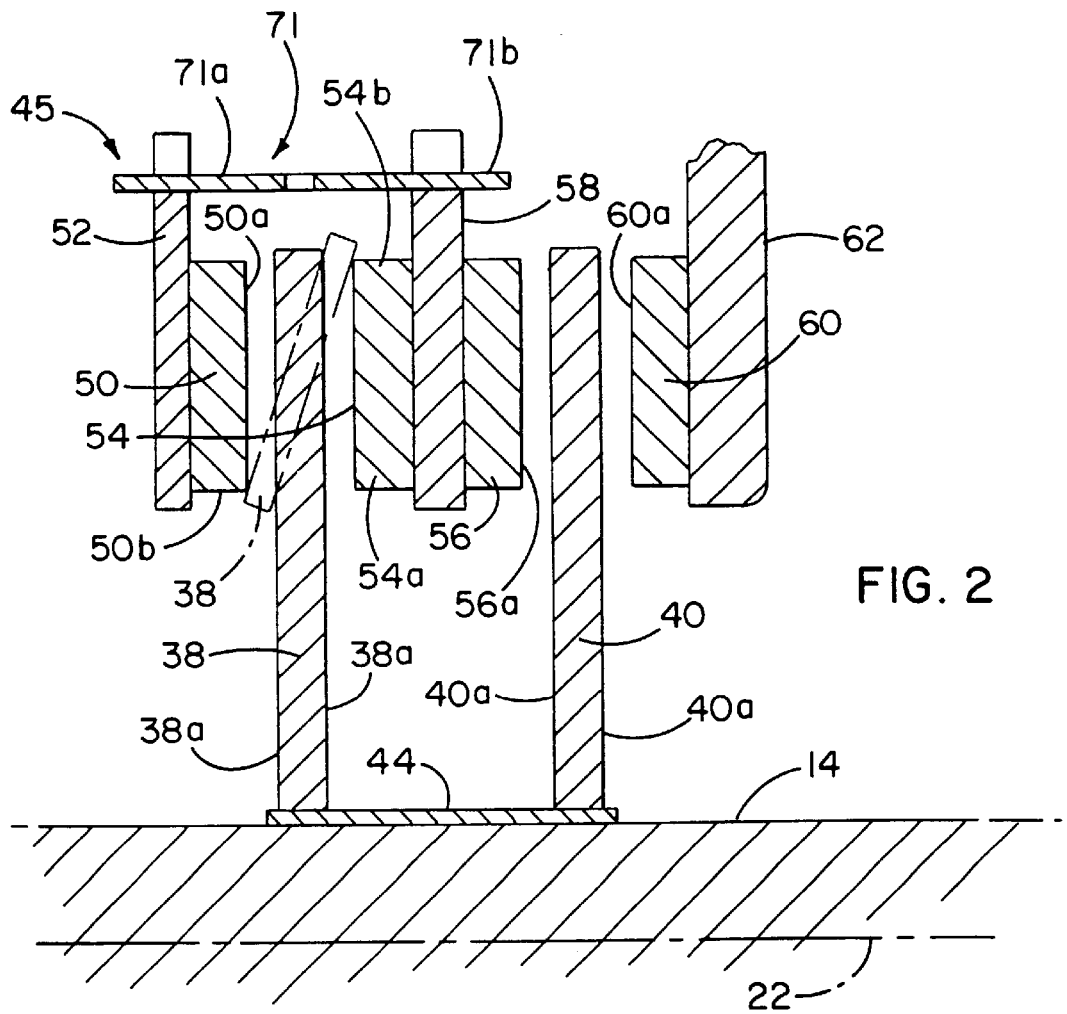
FIG. 2 is a diagrammatic view of an outer spring constraining the brake pads and an inner spring constraining the brake discs.
Figure 3:
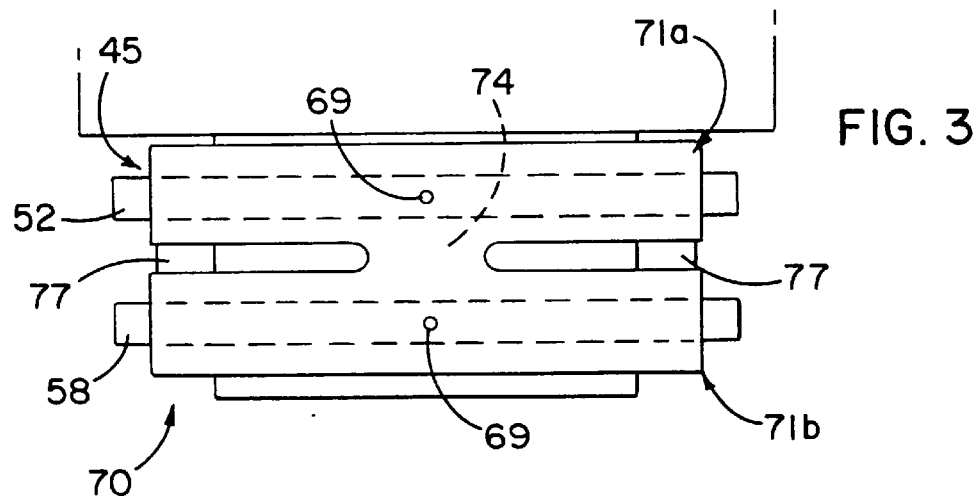
FIG. 3 is a plan view showing the spring constraining the brake pads.
Figure 3A:
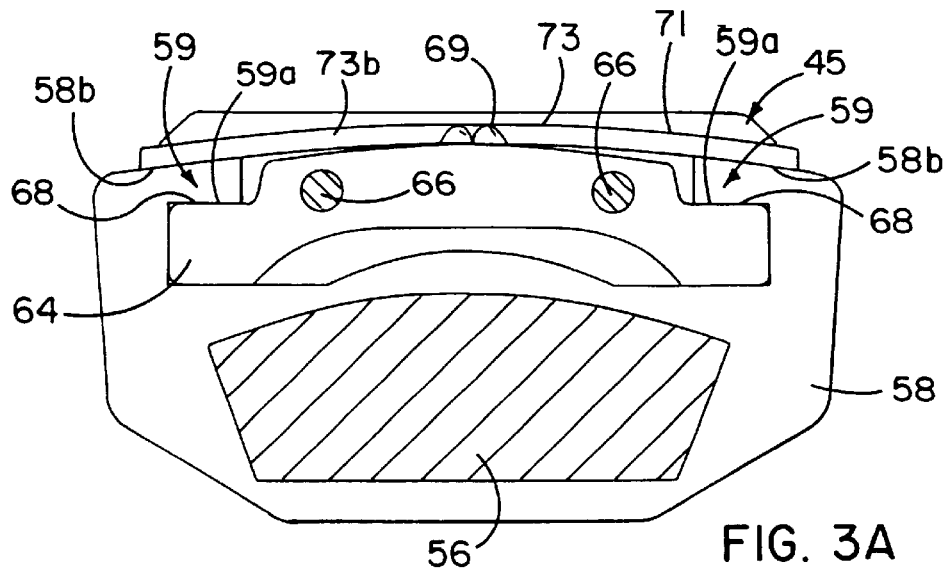
FIG. 3A is a cross-sectional view showing the spring applying restraining forces to the tops of the brake pad carriers.

In the embodiment of the invention, illustrated in FIGS. 2, 3 and 3A, the preferred force applicators comprise flat leaf springs 71a and 71b that have been bent from their flat planar condition to a bow configuration in which outer edges 71c and 71d of the springs abut top end surfaces 52a, 52b, 58a, 58b of the respective slidable brake carriers 52 and 58. The center portion of the leaf spring 71a is secured by a suitable fastener, such as screws 69 threaded through the spring and into the stationary bridge 64 at a central location on the top of the stationary bridge 64.

The force applicator 71 may take many forms, and it is herein illustrated in FIG. 3 as having the two separate leaf spring portions 71a and 71b, each of which is separately applied resilient, biasing forces to its associated brake pad holder 52 or 58. The leaf spring portions 71a and 71b are preferably connected by a short integral, central web 71f, which is located between a pair of facing, elongated slots 77 dividing the spring leaf into the two discrete spring force applicator sections. Thus, if one brake pad holder has high points thereon or other force mitigating or amplifying factors affecting it and its associated spring; the other brake pad holder and its associated spring should be isolated therefrom.

Figure 18:
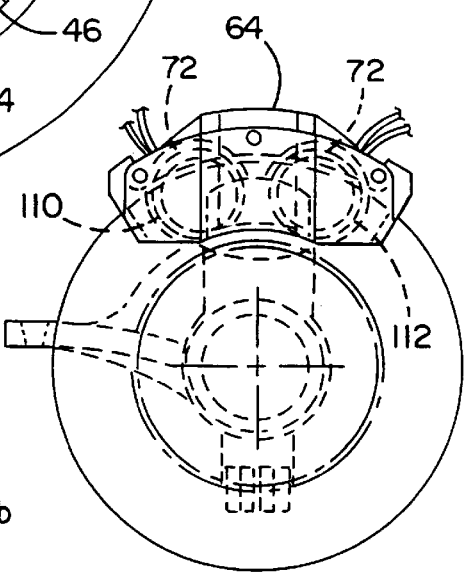
FIG. 18 is a view showing two solenoids to operate the brake pad carriers.
Figure 17:
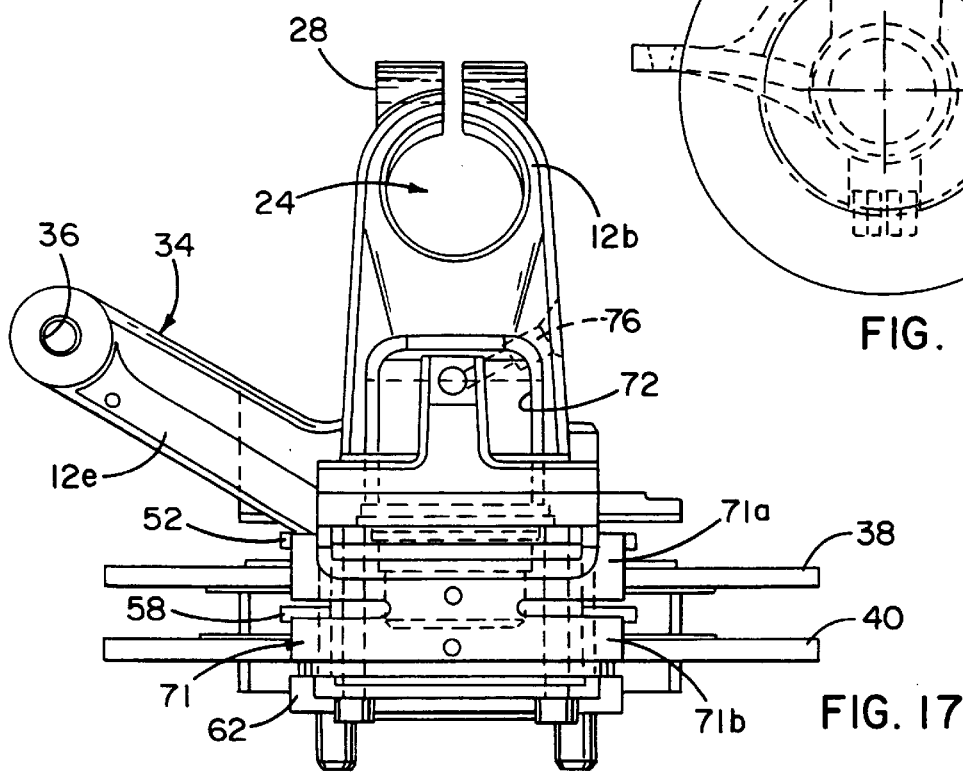
FIG. 17 is a view taken in the direction of the arrow XVII in FIG. 7.

As previously explained in the embodiment of FIGS. 1–17, the brake actuating force used to brake the vehicle is from a brake actuator which is in the form of a hydraulic piston and cylinder assembly 75. In the embodiment of the invention described in connection with FIG. 18, as an alternative to the use of an electric motor and a gear drive used in the prior art, brake-by-wire ABS systems, the solenoid 110 (FIG. 1F) or pair of solenoids 110 and 112 (FIG. 18) may shift the movable brake pad carriers 52 and 58 to carry the slidable brake pads into their respective braking positions and slide the brake discs axially along the hub 14 into their respective braking positions.

The illustrative force actuator system comprises a piston and cylinder assembly operable to urge the pads 50, 54, 56 and 60 into engagement with opposite side surfaces of the discs 38 and 40 to brake the hub 14 and hence, the wheel. The piston and cylinder assembly comprises a cylinder 72 which is defined by the portion 12c of the stub axle 12. Thus, the cylinder is formed integrally with the remainder of the stub axle. A brake-by-wire actuator such as the solenoid 110 shown in FIG. 1F or an electric motor (not shown) may be mounted in the hollow cylinder bore 72 rather than the piston 74. Herein, the piston 74 of the assembly projects from the cylinder and engages the backing plate 52 on the opposite side thereof to the pad 50. The piston and cylinder assembly is operated by supplying hydraulic fluid under pressure to a bore 76 in the stub axle portion 12c which communicates with the cylinder. Herein, the hydraulic pressure for operating the twin disc brake system was about 30 to 35 BAR which is one-half of the 70 BAR pressure of the conventional fixed disc brake on the other test vehicle. The piston had a face of about 200 mm in area. The piston moves out of the cylinder moving the backing plates 52 and 58 and the discs 38 and 40 until the disc 40 engages the pad 60, which does not move.

The hydraulic piston and cylinder assembly 75 includes a seal which acts between the cylinder 72 and the piston 74 to prevent egress of hydraulic fluid from the cylinder. This seal is provided by an elastomeric sealing ring, which is mounted in an annular groove formed in a cylinder wall, the ring projecting from the groove to engage the piston. This sealing ring also serves as an energy storing mechanism. Specifically, when the assembly is operated to move the piston outwardly of the cylinder to put the brake "on", the ring is compressed thereby storing energy therein. When the pressure of the hydraulic fluid in the cylinder is reduced, the ring releases the stored energy therein by moving the piston inwardly of the cylinder (away from the brake disc). Accordingly, the sealing ring has to engage the piston with a significant force. Movement of the piston away from the disc allows the movable pads 50, 54 and 56 of the brake to be moved away from the disc by forces exerted thereon by the rotating slidable brake discs 38 and 40 overcoming the force of the spring 71a and 71b; thereby putting the brake into a "brakes-off" condition.

The return of the piston 74 by the seal reduces the off-brake torque because there is no significant force being applied by the piston to the brake carrier 52 and its brake shoe 50 relative to the facing side of the slidable brake disc 38. Conversely, the floating brake discs 38 and 40 are constrained and float on the hub 14 and will not shift the piston inwardly into the cylinder to displace hydraulic fluid, in the cylinder causing "knock-back" during cornering or other dynamic movements of the wheel assembly. The reduction of knock-back provides a better feel to applying the brakes with less fluid displacement, and eliminates the occasional long pedal displacement feel where substantial fall-back has occurred.

From the foregoing, it will be seen that the present invention provides a much smaller disc brake assembly without the very large caliper sliding and bolts as in the conventional, fixed disc brake. The caliper is large because it carries the cylinder and piston and the slidable bridge must withstand and transfer the large torque brake loads. The present invention is smaller because the cylinder can be integrated with the support and the bridge does not slide and carry the piston. Because of knock back and other problems, this large fixed brake is usually mounted at about 3:00 or 9:00 o'clock positions whereas in the present invention the brake is mounted at the top of the unit at the 12:00 o'clock position. The stiffness problem of the bridge with its deflection, e.g., 0.006 inch, is reduced by a factor of four when using four brake pads and one-half the hydraulic line pressure allowing a smaller and lighter weight brake assembly. The time of mounting and assembly of the brake, as well as repair or replacement, is enhanced because of the front bolting and the telescopic sliding of the brake discs and of the brake is enhanced because of the front bolting and the telescopic sliding of the brake discs and of the brake components versus the bolt from the rear or behind of the fixed brake bolts on which the caliper slides.

As stated above, the illustrated twin brake construction provides a rotational geometry for the disc to have contact between the disc and the brake pads in a random nature, thereby resulting in a lower residual, off-brake torque and reduction of DTV. That is, a gentle random touching of the brake pads and brake disc may occur when driving straight ahead with the pads and disc being held in non-tilting positions relative to one another. The inner, radially directed, force applicator is positioned between the slidable disc, and the hub to provide friction forces to the hub and to the disc which holds them against sliding relative to one another and against generating a noise or a high squeal when the brake disc is heated and expanded. That is, when the brake disc was cold, no squeal or noise was generated at the spline interconnection. But, when the disc was heated and expanded, disc spline members or teeth 42 (FIG. 5) were loose and slid in hub splines 20 and generated high pitched squealing noises.

The preferred radial, inner force applicator 44 comprises, preferably, the flat leaf springs 44a, that are laid tangentially of the hub at their centers 44b (FIGS. 4 and 5) and with their outer ends 44c biased into contact with inner hub surfaces at spaced points, as illustrated in exaggerated form in FIG. 4.

More spaced points of contact can be provided by providing raised ribs 44d on the leaf springs 44x, as illustrated in FIGS. 13 and 14.

The slidable brake disc 38 is thus supported in a floating manner on points of contact 44c (FIG. 4) with the leaf springs 44a on the hub in a floating manner and the brake disc can be shifted axially with forces applied thereto to overcome the frictional forces being applied by the springs at inner disc hub surface. When the brake disc expands considerably due to a disc high temperature, the disc teeth become loose in the colder spline hubs and the frictional forces between the leaf springs 44a and the brake disc and hub restrain the disc from shifting relative to the hub and a resultant squealing noise. The leaf springs 44a impart radially directed forces to the inner hub portion of the brake disc to keep it generally in a plane normal to its rotational axis through the center of the hub. This inner radial positioning by the springs 44a assists in keeping the disc 38 concentric with the rotational axis and within a relatively tight space envelope at the brakes off condition thereby reducing rubbing contact between the brake pad's frictional surfaces and the brake discs 38, 40 and a resultant disc thickness variation (DTV). DTV which is a major source of vibration.

In accordance with an important aspect of the invention, slidable brake discs 38 and 40 float on the hub 14 and its outer rim portion is constrained to its off-brake position, and each disc seeks or floats to an off-brake position established by engagement with slidable brake pads 50, 54 and 56, which slide on the guide surfaces 68 of the bridge-shaped guide member 64. As best seen in FIGS. 2, 3 and 3A, a brake pad, force applicator 71 is positioned to apply radially directed loads to the slidable brake pads to constrain them from sliding with predetermined spring forces. The spring forces are much stronger than that needed merely to prevent rattling or noise suppression. The spring forces are sufficient to restrain the slidable brake pads from moving into contact with the brake discs in an uncontrolled manner. It has been found that if only a light spring force is supplied to suppress noise, that the noise will be abated; but that the brake pads are free to shift and rub against the brake discs causing wear and DTV. Also, when using very light springs, the brake pads will not assist in positioning the outer rims of the slidable brake discs to reduce off-brake residual torque. The illustrated force applicator 71 comprises a pair of leaf springs 71a and 71b (FIGS. 2 and 5) which form the dual functions of preventing rattle and positioning of the pads and discs relative to each other.

After the brake has been applied and released, the rotating brake disc 38 initially rubs against the brake pads and forces from this rubbing cause the disc pads 50 and 56 to slide in opposite directions from the rotating disc. The amount of shifting is controlled by the brake force applicator's frictional force being overcome. Conversely, the off-brake, residual torque position of the rotating brake disc 38 is being constrained by the forced-apart brake pads, which are being held against further sliding by the force applicators. The force applicator springs 44 also are controlling any lateral sliding of the brake disc 38 along the hub. The brake disc 38 is being constrained in its off-load position by the outer force applicators acting on opposite sides of the pair of discs and the inner springs 44 acting on the inner hub portion of the discs. Thus, the disc is controlled to be free to slide and float but not to topple into the brake pads and the brake pads have controlled sliding but are not free to topple or to be free to vibrate into or bang against the discs.

Figure 8:
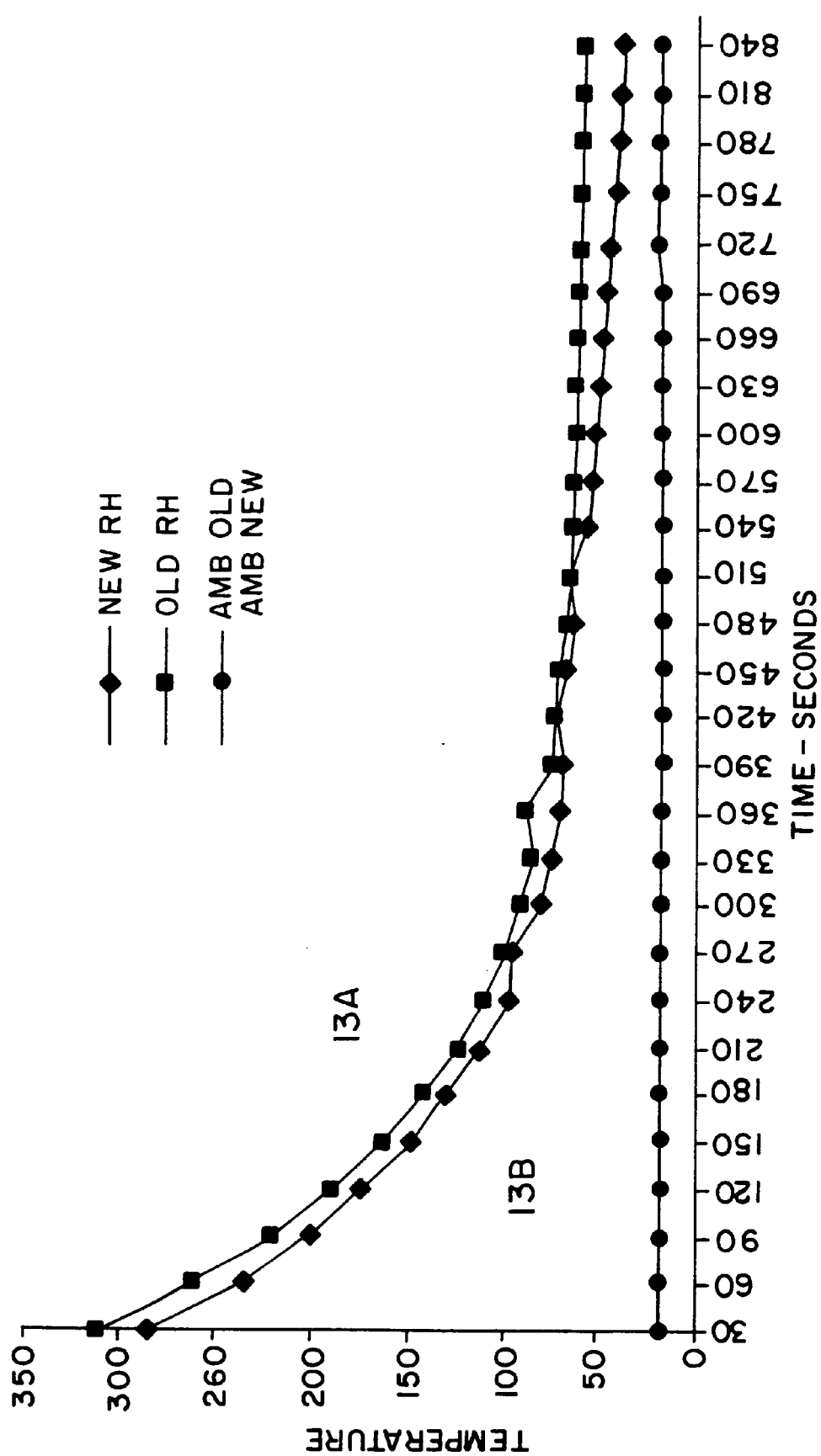
FIG. 8 shows temperature decay curves for disc brakes due to residual drag torque with the brakes off.

The twin disc brake assembly 10 of the present invention, because of its floating geometry as described above, has a significantly lower drag torque, i.e., off-brake residual torque, as will be explained in connection with FIG. 8 which illustrates a typical result for the disc temperature curves from 100 Kph. for the twin disc brake versus a conventional, disc brake. The conventional fixed brake curves 13A plateaus at best is 35° C. above ambient while the twin disc brake 10 continues to cool and stabilizes at 10° above ambient, as illustrated by the straight line 13B. Usually, the conventional caliper brake was found to be about 50°–70° C. above ambient. The assumption made with respect to this test is that dynamic drag due to disc face contact with the pad is proportional to temperature at the disc. The present invention is designed to preferably produce a low residual torque, e.g., about 1 newton meter or less in contrast to about 6 newton meter for the fixed disc brake on the vehicle being tested herein.

In accordance with the invention, the brake discs 38 and 40 must be flat and planar in their rotational plane and substantially normal to the rotational axis 9 (FIG. 2). The brake disc pads have outer planar surfaces 50a, 54a; 56a and 60a which are held by the springs 71a and 71b to be parallel to the disc annular braking surfaces 38a and 40a at the outer rim portion of the brake discs 38 and 40. When the disc geometry is slightly curved, i.e., not a flat planar surface, it has been found that localized rubbing and wear occurred, as illustrated in FIG. 2, at a lower corner 50b of the cylinder brake pads 50 and at the upper outer corner 54b of the opposed brake pad 54 on the slidable pad carrier 58. FIG. 2 shows a very exaggerated tilted disc 38 in lines to illustrate the point being made. The non-flat brake disc did not have random contact with the brake discs 38 and 40; but had localized rubbing contact due to the disc curvature at the inner and outer corners 50b and 54b during each or almost each revolution of the brake disc. Severe disc thickness variations resulted and vibrations of the brake occurred. When the non-flat discs were replaced with flat brake discs the random engagement of the pads and discs was again achieved, the DTV and vibrations associated with the DTV were eliminated. If a localized spot carries the load, you get wear and a pumping action at wheel frequency.

While not illustrated herein, it was found that if the slidable brake pad surfaces 50a, 54a, and 56a (FIG. 2) were not held in parallel relationship to the brake disc faces 38a and 40a, but were freely mounted or loosely mounted on the bridge, that the brake pads could tilt or cock and cause DTV and resultant vibration, as described above for a non-flat brake disc. Stated differently, the springs 71a and 71b were strong enough to hold the brake pads against a tilting that would shift their planar pad surfaces 50a, 54a and 56a from planes perpendicular to the rotational axis 9 and would bring a corner thereof into continual, localized rubbing contact with a brake disc in the off-brake position. Thus, the floating geometry for the brake discs and constraint of the brake pads and discs to achieve random contact at the off-brake position is an important aspect of the invention.

Figure 9:
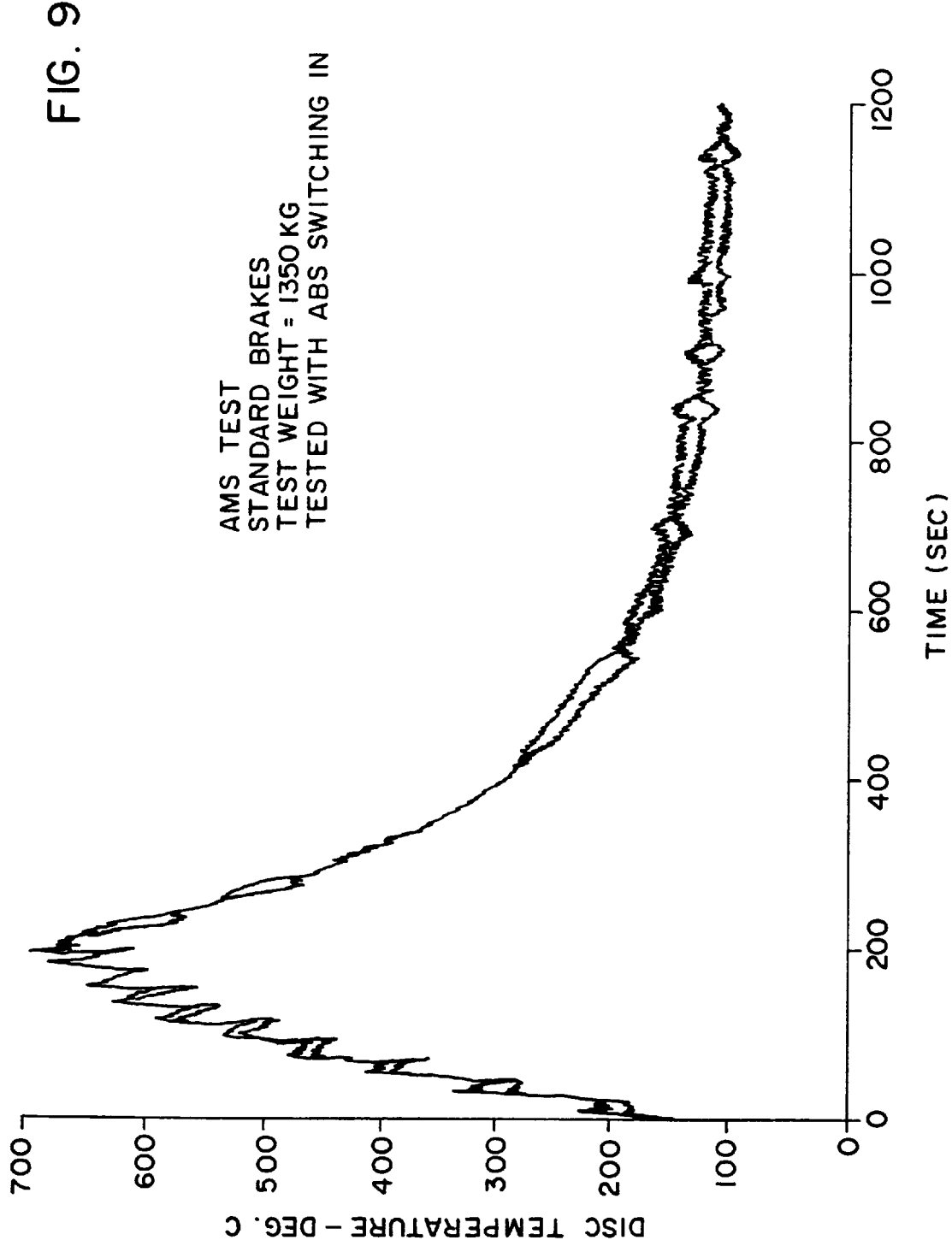
FIG. 9 shows curves for an AMS fade test of a standard fixed brake.
Figure 10:
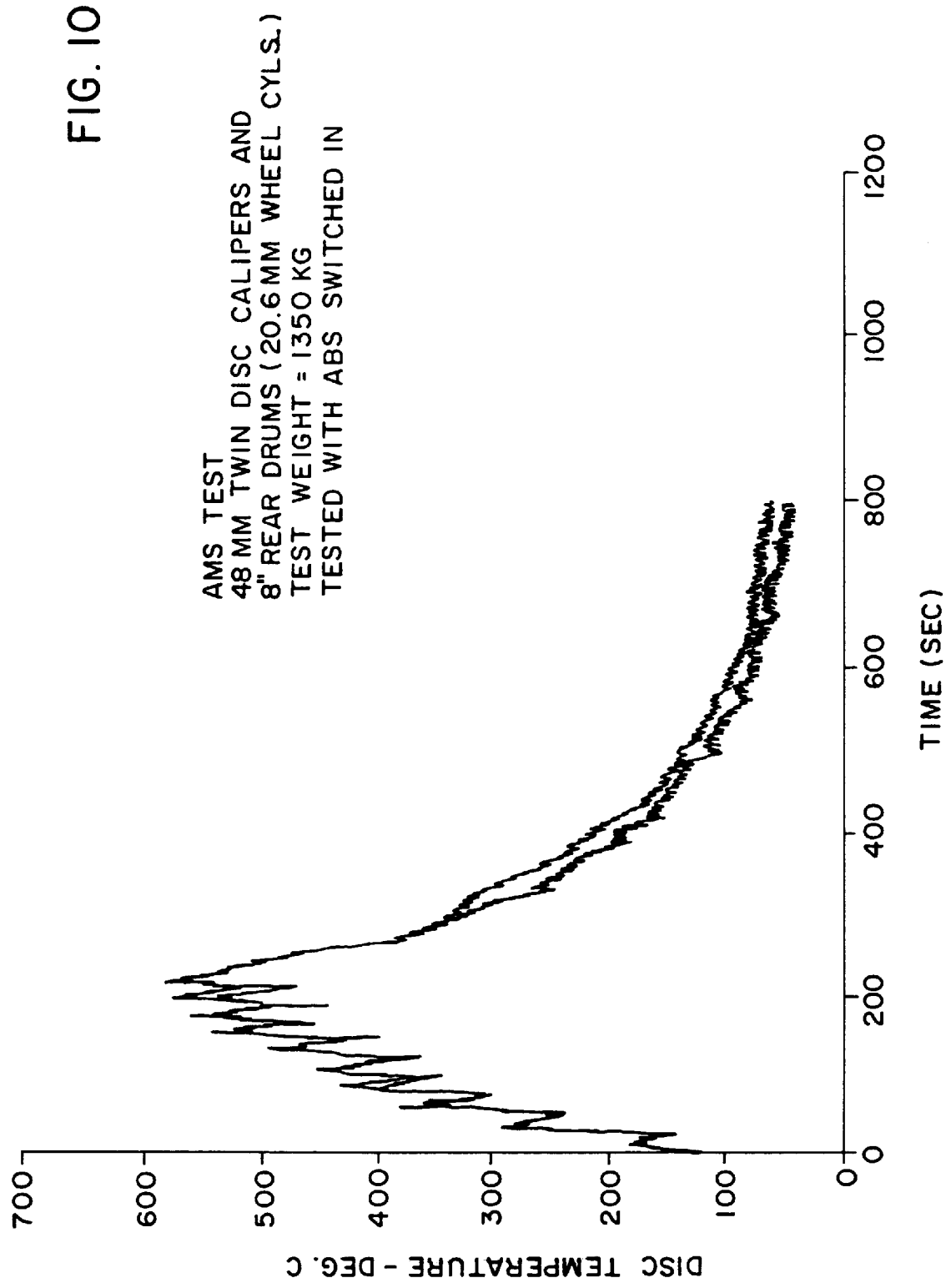
FIG. 10 shows the curves for an AMS fade test of a twin disc brake.

AMS fade tests were run to compare the performance of the ABS twin disc brake assembly 10 of this invention versus the standard factory equipped fixed brake disc, and the results are shown in FIGS. 9 and 10. As seen in FIG. 9, there are ten peaks on the graph for each of the ten braking stops with the brakes cooling and showing a temperature drop of about 30° C. and a maximum disc temperature of about 700° C. which is the Judder range. In contrast, the ABS twin slidable brake disc system had a maximum temperature of 580° C. (FIG. 10) or about 120° C. lower than the conventional disc brake. The temperature drop between braking events was about 80° compared to only a 30° C. temperature drop for conventional disc brake. Thus, the present ABS system passed the AMS fade test where the conventional ABS brake system being tested did not pass the AMS test.

In accordance with the present invention, the preferred drive connection 19 has the brake disc teeth 42 sized to fit the grooves 20 along both of the groove flanks 21 without using oversized grooves. This is in contrast to the prior art which used oversized spline grooves and small springs therein to engage the driving side flanks of the hub and disc; but this prior art solution led to other problems like disc wobble on the hub. Preferably, the driving connection of the present invention is a very efficient one such as that akin to a pair of meshed gears where the contact is a line of contact across the engaged flanks 21 (FIG. 15A) rather than a small point of contact to provide lower unit pressures. Preferably, this line of contact is maintained whether the brake disc has a high or low temperature. The plastic deformation at the engaged spline surfaces keeps the engaged spline members clean from corrosion. The present invention eliminates the brinneling, dust generation, and squirming of the disc at high braking torque.

What is claimed is:

1. A vehicle front wheel suspension and braking assembly for providing a reduced turning circle comprising:
    a stub axle having a cast metal body and having therein a hub for mounting a wheel for turning and rotating and a substantially vertical, wheel turning axis through the stub axle;
    a top support suspension member on the suspension connected to and supporting an upper portion of the stub axle for turning about the substantially vertical turning axis;
    a bottom support suspension member on the suspension connected to and supporting a lower portion of the stub axle for turning about the substantially vertical turning axis;
    a steering member on the wheel suspension connected to the stub axle to turn the stub axle to turn the front wheel about the substantially vertical, turning axis;
    at least two slidable brake discs mounted on the hub for axial sliding movement along the hub;
    a brake force applying and clamping assembly having slidable brake pads and a fixed brake pad for cooperating with the slidable brake discs, to clamp against opposite sides of the brake discs during a braking operation;
    the brake force and clamping assembly including a fixed, rigid support bridge projecting outwardly from the stub axle at a top portion of the stub axle and carrying the slidable brake pads;
    an outer portion of the rigid support bridge carrying the fixed brake pad; and
    a force actuator mounted in an opening in the upper portion of the cast metal body of the stub axle adjacent to a wheel turning axis passing through stub axle, the fixed support bridge being located adjacent the force actuator at the upper portion of the cast metal body to reduce the wheel turning circle and to increase a locking angle before the braking assembly fouls against a suspension assembly.

2. A vehicle front wheel suspension in accordance with claim 1 wherein the brake force applying and clamping assembly comprises:
    the outer portion of the rigid bridge support being a distal end of the fixed support bridge carrying the fixed brake pad and having a limited projection toward a suspension member for engagement therewith during a steering of the suspension to a lock angle position.

3. A vehicle front wheel suspension in accordance with claim 1 wherein the force actuator comprises a hydraulic cylinder and piston; and
    springs mounting the slidable brake discs to float on the hub and thereby to limit the exertion of fall-back forces on the piston during side loading on the brake discs during cornering of the vehicle.

4. A vehicle front wheel suspension and a braking assembly for providing a reduced turning circle comprising:
    a stub axle having a cast metal body and having therein a hub for mounting a wheel for turning and rotating about a wheel turning axis through the stub axles;
    a top support suspension member on the suspension connected to and supporting an upper portion of the stub axle for turning about wheel turning axis;
    a bottom support suspension member on the suspension connected to and supporting a lower portion of the stub axle for turning about the wheel turning axis;
    a steering member on the wheel suspension connected to the stub axle to turn the stub axle to turn the front wheel about the wheel turning axis;
    at least two slidable brake discs mounted on the hub for axial sliding movement along the hub;
    a substantially horizontal, cylindrical opening in the upper portion of the stub axle defining a cylinder for containing brake liquid and being adjacent to the wheel turning axis;
    a piston mounted in the horizontal cylinder movable by the brake liquid for shifting the slidable brake pads;
    a rigid brake pad support fixedly mounted to the upper portion of the stub axle and extending outwardly therefrom;
    a fixed brake pad on an outer end portion of the brake pad support for braking engagement with an outer face of a slidable brake disc; and
    the brake pad support, the cylinder and the piston being mounted on the upper portion of stub axle adjacent the wheel turning axis through the stub axle to position the brake disc and brake pad support to reduce the wheel turning circle and to increase a locking angle for the suspension.

5. A vehicle front wheel suspension in accordance with claim 4 wherein:
    three slidable brake pads are mounted on the fixed brake support.

6. A suspension in accordance with claim 4 wherein the stub axle comprises a substantial horizontal-projecting portion on the upper portion of the stub axle with a bore therein located on the vertical turning axis;
    the horizontal cylinder opening in the upper portion of the stub axle being located in a plane above the horizontal projecting portion.

7. A vehicle front wheel and brake assembly comprising:
    a stub axle having a hub mounting a wheel for rotation;
    a plurality of suspensions member supporting the stub axle and connected thereto to turn the stub and the wheel through a predetermined locking angle about a substantially vertical, turning axis;
    a cast body for the stub axle having laterally-extending, integral portions each connected to one of the suspension members;

an upper integral portion on the stub axle body;

a brake pad support fixed to the upper portion of the stub axle and having slide surfaces thereon;

slidable brake pads slidably mounted on the support slide surfaces and one fixed brake pad fixed to the brake pad support adjacent sliding movement;

a brake pad force applicator fixed to the upper portion of the stub axle and having a hydraulic cylinder and piston for sliding the slidable brake pads along the slidable surfaces of the brake pad support;

slidable brake discs mounted on the hub of the stub axle engageable with the brake pads;

a top portion of the slidable brake discs being engageable by the brake pads during a braking operation;

spring force applicators for exerting a spring force between the hub and the brake discs to limit the exertion of fall back forces on the piston during side loading on the brake discs during cornering of the vehicle; and the brake support and cylinder and piston being located adjacent the wheel turning axis to reduce the wheel turning circle and to increase the locking angle, the spring force applicators for the brake pads exerting forces thereon to position them normal to the rotational axis in order to reduce residual torque.

8. A vehicle front wheel and brake assembly in accordance with claim 7 wherein:

a second spring force applicator acts between the slidable brake pads and the brake pad support to bias the brake pads into planes normal to the wheel axis to reduce residual torque and to have only random contact with the brake discs when in an off-brake position; and a cylindrical, horizontal bore in the upper portion of the stub axle's cast body contains the brake pad force applicator.

9. A vehicle front wheel and brake assembly in accordance with claim 8 wherein a piston and hydraulic fluid are provided in the cylindrical, horizontal bore.

10. A vehicle front wheel and brake assembly in accordance with claim 8 wherein the brake pad force applicator comprises an electrical actuator is mounted in the cylindrical, horizontal bore.

11. A vehicle front wheel and brake assembly in accordance with claim 7 wherein:

an upper arm on the stub axle is connected to an upper one of the suspension members; and the horizontal bore is located in a horizontal plane closely adjacent the upper arm of the stub axle.

* * * * *

UNITED STATES PATENT AND TRADEMARK OFFICE
CERTIFICATE OF CORRECTION

PATENT NO. : 6,223,863 B1
DATED : May 1, 2001
INVENTOR(S) : Kenneth J. Bunker

Page 1 of 1

It is certified that error appears in the above-identified patent and that said Letters Patent is hereby corrected as shown below:

Title page,
FOREIGN APPLICATION PRIORITY DATA (GB) 9625854 change "December 12, 1999" to -- December 12, 1996 --

Column 16, claim 6,
Line 52, change "substantial" to -- substantially --.

Column 18, claim 10,
Line 17, delete "is".

Signed and Sealed this

Thirteenth Day of November, 2001

Attest:

NICHOLAS P. GODICI
Attesting Officer
Acting Director of the United States Patent and Trademark Office